(12) United States Patent
Allman

(10) Patent No.: US 10,045,633 B2
(45) Date of Patent: Aug. 14, 2018

(54) CUSHIONING ASSEMBLIES WITH THERMOPLASTIC ELEMENTS ENCAPSULATED IN THERMOSET PROVIDING CUSTOMIZABLE SUPPORT AND AIRFLOW, AND RELATED METHODS

(71) Applicant: Noel Group LLC, Zebulon, NC (US)

(72) Inventor: Michael Allman, Wilson, NC (US)

(73) Assignee: Noel Group LLC, Zebulon, NC (US)

( * ) Notice: Subject to any disclaimer, the term of this patent is extended or adjusted under 35 U.S.C. 154(b) by 635 days.

(21) Appl. No.: 14/260,621

(22) Filed: Apr. 24, 2014

(65) Prior Publication Data
US 2014/0317856 A1    Oct. 30, 2014

Related U.S. Application Data

(60) Provisional application No. 61/816,417, filed on Apr. 26, 2013.

(51) Int. Cl.
*A47C 27/14* (2006.01)
*B29C 70/70* (2006.01)
(Continued)

(52) U.S. Cl.
CPC .......... *A47C 27/144* (2013.01); *A47C 27/065* (2013.01); *A47C 27/20* (2013.01); *B29C 70/70* (2013.01); *B29L 2031/751* (2013.01)

(58) Field of Classification Search
CPC .......... A47C 27/14; A47C 27/15; A47C 27/16; A47C 27/20; A47C 27/085; A47C 27/088
See application file for complete search history.

(56) References Cited

U.S. PATENT DOCUMENTS

| 831,441 A | 9/1906 | Johnson |
| 1,579,074 A | 3/1926 | Burton |

(Continued)

FOREIGN PATENT DOCUMENTS

| CA | 2791073 A1 | 4/2013 |
| CN | 2137475 Y | 7/1993 |

(Continued)

OTHER PUBLICATIONS

First Office Action for Canadian Patent Application No. 2,885,063, dated Feb. 9, 2016, 3 pages.

(Continued)

*Primary Examiner* — Nicholas F Polito
*Assistant Examiner* — Ifeolu A Adeboyejo
(74) *Attorney, Agent, or Firm* — Withrow & Terranova, PLLC

(57) ABSTRACT

Embodiments disclosed herein include cushioning assemblies with thermoplastic elements encapsulated in thermoset providing customizable support and airflow. A cushioning assembly for a cushion provides cushioning and support for a user. Thermoplastic elements are encapsulated within a thermoset matrix to provide additional support at specific sections of the cushion. The shape and location of the thermoplastic elements may be configured to provide the support and cushioning characteristics desired by a user. The thermoplastic elements may include air passageways in communication with the outside. In this manner, support is provided precisely where needed for the user, the weight and expense of the cushion is reduced by eliminating expensive redundant support, and the heat and humidity that can cause user discomfort is reduced.

14 Claims, 20 Drawing Sheets

(51) Int. Cl.
    *A47C 27/06*     (2006.01)
    *A47C 27/20*     (2006.01)
    *B29L 31/00*     (2006.01)

(56) References Cited

U.S. PATENT DOCUMENTS

| | | | |
|---|---|---|---|
| 1,761,848 A * | 6/1930 | Sitzman | B28B 23/0068 |
| | | | 181/285 |
| 1,930,285 A | 10/1933 | Robinson | |
| 2,192,516 A | 3/1940 | Cunnington | |
| 2,241,644 A | 5/1941 | Nichols et al. | |
| 2,369,000 A | 2/1945 | Page | |
| 2,429,508 A | 10/1947 | Belaieff | |
| 2,604,642 A | 7/1952 | Marco | |
| 2,659,418 A | 11/1953 | Berman | |
| 2,682,125 A | 6/1954 | Coffield | |
| 2,800,165 A | 7/1957 | Talalay et al. | |
| 2,835,313 A | 5/1958 | Dodge | |
| 2,835,906 A | 5/1958 | Robbins | |
| 2,917,807 A | 12/1959 | Scholl | |
| 2,955,056 A | 10/1960 | Knox | |
| 3,026,544 A | 3/1962 | Persicke et al. | |
| 3,047,888 A | 8/1962 | Shecter et al. | |
| 3,061,460 A | 10/1962 | Schickedanz | |
| 3,099,021 A | 7/1963 | Wetzler | |
| 3,107,377 A | 10/1963 | Nathan | |
| 3,114,722 A | 12/1963 | Einhorn et al. | |
| 3,188,665 A | 6/1965 | Snyder | |
| 3,222,697 A | 12/1965 | Scheermesser | |
| 3,251,078 A | 5/1966 | Calla | |
| 3,283,357 A | 11/1966 | Decker et al. | |
| 3,287,748 A * | 11/1966 | Trogdon | A47C 27/144 |
| | | | 264/28 |
| 3,319,272 A | 5/1967 | Eller | |
| 3,401,411 A | 9/1968 | Morrison | |
| 3,483,069 A | 12/1969 | Cairns et al. | |
| 3,503,840 A | 3/1970 | Parrish | |
| 3,531,552 A | 9/1970 | Getz et al. | |
| 3,551,924 A | 1/1971 | Frye, Sr. | |
| 3,591,444 A | 7/1971 | Hoppe | |
| 3,605,145 A * | 9/1971 | Graebe | A47C 27/081 |
| | | | 297/DIG. 3 |
| 3,607,596 A | 9/1971 | Fairbanks | |
| 3,607,797 A | 9/1971 | Rubens et al. | |
| 3,618,144 A * | 11/1971 | Frey | A47C 27/00 |
| | | | 267/142 |
| 3,627,622 A | 12/1971 | Vega | |
| 3,691,569 A | 9/1972 | Ikada | |
| 3,719,963 A | 3/1973 | Bullock, Jr. | |
| 3,728,206 A | 4/1973 | Buese | |
| 3,813,462 A | 5/1974 | Roberts | |
| 3,846,857 A | 11/1974 | Weinstock | |
| 3,878,133 A | 4/1975 | Rubens | |
| 3,922,429 A | 11/1975 | Welch et al. | |
| 3,989,781 A | 11/1976 | Chant | |
| 4,051,210 A | 9/1977 | Wallenberger | |
| D247,373 S | 2/1978 | Puccio | |
| 4,073,020 A | 2/1978 | Stalter et al. | |
| 4,106,139 A | 8/1978 | Southard | |
| 4,110,857 A | 9/1978 | Banister | |
| 4,134,166 A | 1/1979 | Schuder | |
| 4,143,435 A | 3/1979 | Masuda | |
| 4,146,562 A | 3/1979 | Fukushima et al. | |
| 4,159,355 A | 6/1979 | Kaufman | |
| 4,169,184 A | 9/1979 | Pufahl | |
| 4,213,214 A | 7/1980 | Gilhooly | |
| 4,224,374 A | 9/1980 | Priest | |
| 4,230,521 A | 10/1980 | Cobb et al. | |
| 4,260,660 A | 4/1981 | McCarter | |
| 4,267,927 A * | 5/1981 | English, Jr. | B65D 81/113 |
| | | | 206/524 |
| 4,268,557 A * | 5/1981 | Bracesco | A47C 7/20 |
| | | | 156/79 |
| 4,276,107 A | 6/1981 | Pufahl | |
| 4,279,953 A | 7/1981 | Barden et al. | |
| 4,281,197 A | 7/1981 | Oblinger | |
| 4,306,395 A * | 12/1981 | Carpenter | B28B 7/183 |
| | | | 264/228 |
| 4,348,243 A | 9/1982 | Craubner | |
| 4,350,734 A | 9/1982 | Hammond | |
| 4,370,767 A | 2/1983 | Fraser | |
| 4,393,116 A | 7/1983 | Taylor | |
| 4,397,053 A | 8/1983 | Fanti | |
| 4,407,031 A * | 10/1983 | Michiels | A47C 27/144 |
| | | | 5/728 |
| 4,432,110 A | 2/1984 | Sutton | |
| 4,438,221 A | 3/1984 | Fracalossi et al. | |
| 4,524,473 A | 6/1985 | Fanti | |
| 4,525,386 A | 6/1985 | Weisman | |
| 4,537,825 A | 8/1985 | Yardley | |
| 4,569,861 A | 2/1986 | Smith et al. | |
| 4,603,445 A | 8/1986 | Spann | |
| 4,618,517 A | 10/1986 | Simko, Jr. | |
| 4,620,337 A | 11/1986 | Williams et al. | |
| 4,628,557 A | 12/1986 | Murphy | |
| 4,631,768 A | 12/1986 | Ferrall | |
| 4,670,925 A * | 6/1987 | Carussi | A47C 7/18 |
| | | | 264/45.1 |
| 4,683,246 A | 7/1987 | Davis et al. | |
| 4,700,447 A | 10/1987 | Spann | |
| 4,713,854 A | 12/1987 | Graebe | |
| 4,722,158 A | 2/1988 | Urdaneta | |
| 4,736,932 A * | 4/1988 | Haslim | A47C 7/027 |
| | | | 188/83 |
| 4,741,058 A | 5/1988 | Williams et al. | |
| 4,755,408 A | 7/1988 | Noel | |
| 4,780,167 A | 10/1988 | Hill | |
| 4,796,316 A | 1/1989 | Boselli | |
| 4,828,325 A | 5/1989 | Brooks | |
| 4,837,060 A | 6/1989 | Bambara et al. | |
| 4,837,881 A | 6/1989 | Kondo et al. | |
| 4,879,776 A | 11/1989 | Farley | |
| 4,952,450 A | 8/1990 | Noel | |
| D310,460 S | 9/1990 | Vergnano | |
| 4,955,096 A | 9/1990 | Gilroy et al. | |
| 4,957,798 A | 9/1990 | Bogdany | |
| 4,965,900 A * | 10/1990 | Smith | A61F 5/485 |
| | | | 5/484 |
| 4,966,919 A | 10/1990 | Williams, Jr. et al. | |
| 4,972,535 A | 11/1990 | Goldman | |
| 4,997,804 A | 3/1991 | Pekala | |
| 4,999,868 A | 3/1991 | Kraft | |
| 5,022,111 A | 6/1991 | Fenner, Sr. | |
| 5,031,261 A | 7/1991 | Fenner, Sr. | |
| 5,037,859 A | 8/1991 | Williams, Jr. et al. | |
| 5,038,433 A | 8/1991 | Farley | |
| 5,044,027 A * | 9/1991 | Moon | A47C 27/065 |
| | | | 5/652 |
| 5,047,436 A | 9/1991 | Hill et al. | |
| 5,070,560 A | 12/1991 | Wilkinson | |
| D322,907 S | 1/1992 | Raburn | |
| 5,083,335 A | 1/1992 | Krouskop et al. | |
| 5,086,084 A | 2/1992 | Michaelson | |
| 5,087,514 A | 2/1992 | Graefe | |
| 5,098,778 A | 3/1992 | Minnick | |
| 5,101,527 A | 4/1992 | Wadsworth, III et al. | |
| 5,114,773 A | 5/1992 | Bogdany | |
| 5,118,555 A | 6/1992 | Horovitz | |
| 5,132,549 A | 7/1992 | Allan et al. | |
| 5,136,740 A | 8/1992 | Kraft | |
| 5,138,730 A | 8/1992 | Masuda | |
| 5,206,082 A | 4/1993 | Malone | |
| 5,248,550 A | 9/1993 | Turpin et al. | |
| 5,272,001 A | 12/1993 | Weisman | |
| 5,274,846 A | 1/1994 | Kolsky | |
| 5,280,890 A | 1/1994 | Wydra | |
| 5,327,597 A | 7/1994 | Rothbard | |
| 5,366,999 A | 11/1994 | Giez et al. | |
| 5,369,826 A | 12/1994 | Ikeda | |
| 5,387,050 A | 2/1995 | Hovis et al. | |
| 5,389,317 A | 2/1995 | Grimmer | |
| 5,393,588 A | 2/1995 | Weddendorf | |
| 5,395,860 A | 3/1995 | Leung et al. | |
| 5,415,822 A | 5/1995 | Cook | |

(56) References Cited

U.S. PATENT DOCUMENTS

| | | | |
|---|---|---|---|
| 5,418,257 A | 5/1995 | Weisman | |
| 5,430,901 A | 7/1995 | Farley | |
| 5,440,846 A * | 8/1995 | Record | C04B 28/02 |
| | | | 52/309.12 |
| 5,451,451 A | 9/1995 | Minnick | |
| 5,452,488 A | 9/1995 | Reinhardt | |
| 5,488,746 A | 2/1996 | Hudson | |
| 5,491,852 A * | 2/1996 | Maucher | A47C 27/146 |
| | | | 5/730 |
| 5,492,662 A | 2/1996 | Kargol et al. | |
| 5,494,627 A | 2/1996 | Kargol et al. | |
| 5,511,260 A | 4/1996 | Dinsmoor, III et al. | |
| 5,513,402 A | 5/1996 | Schwartz | |
| 5,544,908 A | 8/1996 | Fezio | |
| 5,642,557 A | 7/1997 | Clews | |
| 5,643,139 A | 7/1997 | Stout et al. | |
| 5,686,167 A | 11/1997 | Rudy | |
| 5,701,623 A | 12/1997 | May | |
| 5,721,035 A | 2/1998 | Dunn | |
| 5,740,574 A | 4/1998 | Piraino | |
| D394,578 S | 5/1998 | Raburn | |
| 5,749,111 A | 5/1998 | Pearce | |
| 5,755,901 A | 5/1998 | Ormachea | |
| 5,801,211 A | 9/1998 | Tornero et al. | |
| 5,806,796 A | 9/1998 | Healey | |
| D401,451 S | 11/1998 | Sherman | |
| D406,051 S | 2/1999 | Ross | |
| 5,869,172 A | 2/1999 | Caldwell | |
| 5,876,652 A | 3/1999 | Rorabaugh et al. | |
| 5,919,413 A | 7/1999 | Avila | |
| 5,944,389 A | 8/1999 | Zenba et al. | |
| 5,945,461 A | 8/1999 | Gosiewski et al. | |
| 5,960,497 A | 10/1999 | Castellino et al. | |
| 5,977,271 A | 11/1999 | McKay et al. | |
| 5,987,668 A | 11/1999 | Ackley | |
| D418,394 S | 1/2000 | King | |
| 6,026,527 A | 2/2000 | Pearce | |
| 6,108,835 A | 8/2000 | Hwang | |
| 6,129,978 A | 10/2000 | Caldwell | |
| 6,132,323 A | 10/2000 | Smith et al. | |
| 6,139,956 A | 10/2000 | Endoh et al. | |
| 6,212,720 B1 | 4/2001 | Antinori et al. | |
| 6,237,173 B1 | 5/2001 | Schlichter et al. | |
| 6,258,310 B1 | 7/2001 | Sardanopoli et al. | |
| 6,262,137 B1 | 7/2001 | Kozma et al. | |
| 6,284,346 B1 | 9/2001 | Sheridan | |
| 6,286,167 B1 | 9/2001 | Stolpmann | |
| 6,290,794 B1 * | 9/2001 | Yates | B62J 1/18 |
| | | | 156/145 |
| 6,306,235 B1 | 10/2001 | Henderson | |
| 6,309,235 B1 | 10/2001 | Argaut | |
| 6,317,912 B1 | 11/2001 | Graebe et al. | |
| 6,323,251 B1 | 11/2001 | Perez et al. | |
| D456,197 S | 4/2002 | McClure et al. | |
| 6,406,780 B1 | 6/2002 | Sutherland | |
| 6,425,153 B1 | 7/2002 | Reswick | |
| 6,446,270 B1 * | 9/2002 | Durr | A42B 3/061 |
| | | | 2/412 |
| D467,118 S | 12/2002 | McClure et al. | |
| 6,537,405 B1 | 3/2003 | Henderson et al. | |
| 6,555,214 B1 | 4/2003 | Yates | |
| 6,574,814 B2 | 6/2003 | Collard et al. | |
| 6,596,389 B1 | 7/2003 | Hallett et al. | |
| 6,612,556 B2 | 9/2003 | Petrina | |
| 6,643,876 B2 | 11/2003 | Visser et al. | |
| 6,658,683 B2 | 12/2003 | Parvin | |
| 6,687,935 B2 | 2/2004 | Reeder et al. | |
| 6,691,482 B1 | 2/2004 | Ault | |
| 6,701,551 B1 | 3/2004 | Antinori | |
| 6,740,381 B2 | 5/2004 | Day et al. | |
| 6,743,830 B2 | 6/2004 | Soane et al. | |
| 6,807,698 B2 | 10/2004 | Torbet et al. | |
| 6,866,915 B2 | 3/2005 | Landvik | |
| 6,868,569 B2 | 3/2005 | VanSteenburg | |
| 6,920,287 B1 | 7/2005 | Hinds et al. | |
| 6,949,588 B2 | 9/2005 | Park | |
| 6,967,833 B2 | 11/2005 | Boykin et al. | |
| 7,045,206 B1 | 5/2006 | Granata et al. | |
| 7,059,001 B2 | 6/2006 | Woolfson | |
| 7,076,822 B2 | 7/2006 | Pearce | |
| 7,086,108 B1 | 8/2006 | Litvak | |
| 7,090,911 B2 | 8/2006 | Lascelles | |
| 7,093,619 B2 | 8/2006 | Watanabe et al. | |
| 7,108,252 B2 | 9/2006 | Jayakumaran | |
| 7,159,620 B2 | 1/2007 | Kissell | |
| 7,166,646 B2 | 1/2007 | Loh et al. | |
| 7,173,070 B2 | 2/2007 | Koffler | |
| 7,191,483 B2 | 3/2007 | Hochschild | |
| 7,281,917 B2 | 10/2007 | Hannen | |
| 7,285,316 B2 | 10/2007 | Meyer-Ahrens et al. | |
| 7,334,280 B1 | 2/2008 | Swartzburg | |
| 7,386,903 B2 | 6/2008 | Hochschild | |
| 7,393,577 B2 | 7/2008 | Day et al. | |
| 7,426,767 B2 | 9/2008 | Mossbeck | |
| D579,586 S | 10/2008 | Mattingly | |
| 7,444,703 B2 | 11/2008 | Jansen | |
| 7,452,585 B1 | 11/2008 | Wong et al. | |
| 7,490,819 B2 | 2/2009 | Molitor | |
| 7,491,753 B2 | 2/2009 | Krishnan | |
| 7,496,981 B2 | 3/2009 | Alonso Cucurull | |
| 7,607,911 B2 | 10/2009 | Sperry et al. | |
| 7,644,461 B2 | 1/2010 | Lee | |
| 7,666,341 B2 * | 2/2010 | Pearce | B29C 45/27 |
| | | | 264/328.11 |
| 7,730,566 B2 * | 6/2010 | Flick | A47C 7/021 |
| | | | 267/153 |
| 7,793,372 B2 | 9/2010 | Lean et al. | |
| 7,794,827 B2 | 9/2010 | Palmer et al. | |
| 7,805,791 B2 * | 10/2010 | Malzl | A47C 27/001 |
| | | | 5/722 |
| 7,823,351 B2 * | 11/2010 | Tiberi | B29C 44/1233 |
| | | | 52/233 |
| 7,845,035 B2 | 12/2010 | Letton et al. | |
| D640,535 S | 6/2011 | Austro | |
| 8,034,445 B2 | 10/2011 | Landvik et al. | |
| 8,124,219 B2 * | 2/2012 | Miyachi | B29C 44/583 |
| | | | 264/45.5 |
| 8,127,383 B2 | 3/2012 | Gladney et al. | |
| D663,152 S | 7/2012 | Shive | |
| 8,307,482 B2 | 11/2012 | Gladney et al. | |
| D673,402 S | 1/2013 | Kuzyk | |
| D675,051 S | 1/2013 | Sobran et al. | |
| 8,346,373 B2 | 1/2013 | Thompson-Nauman et al. | |
| 8,356,373 B2 | 1/2013 | Allman et al. | |
| D675,856 S | 2/2013 | Yiannaki | |
| 8,418,297 B2 | 4/2013 | Mikkelsen et al. | |
| 8,434,748 B1 * | 5/2013 | Pearce | A47C 27/20 |
| | | | 267/142 |
| D688,069 S | 8/2013 | Henderson et al. | |
| D690,536 S | 10/2013 | Young et al. | |
| D691,400 S | 10/2013 | Young | |
| D691,401 S | 10/2013 | Sobran | |
| D692,690 S | 11/2013 | Sobran | |
| D692,691 S | 11/2013 | Henderson et al. | |
| D692,692 S | 11/2013 | Allman et al. | |
| D692,693 S | 11/2013 | Allman et al. | |
| D692,694 S | 11/2013 | Allman et al. | |
| D693,144 S | 11/2013 | Sobran | |
| D693,145 S | 11/2013 | Young et al. | |
| D693,146 S | 11/2013 | Allman et al. | |
| D693,147 S | 11/2013 | Henderson et al. | |
| D693,148 S | 11/2013 | Young et al. | |
| D693,149 S | 11/2013 | Allman et al. | |
| D694,041 S | 11/2013 | Sobran et al. | |
| D694,552 S | 12/2013 | Allman et al. | |
| D694,553 S | 12/2013 | Sobran | |
| D694,554 S | 12/2013 | Yiannaki | |
| D697,337 S | 1/2014 | Young | |
| 8,932,692 B2 * | 1/2015 | Pearce | A47C 27/056 |
| | | | 156/242 |
| 8,984,690 B2 | 3/2015 | Chunglo | |
| 2001/0029632 A1 | 10/2001 | Parvin | |
| 2001/0044972 A1 | 11/2001 | Kutschi | |

(56) References Cited

U.S. PATENT DOCUMENTS

| | | | |
|---|---|---|---|
| 2001/0047550 A1* | 12/2001 | Ferraiolo | F16L 1/24 5/690 |
| 2002/0054996 A1 | 5/2002 | Rheenen | |
| 2002/0162173 A1 | 11/2002 | Formenti | |
| 2002/0185905 A1 | 12/2002 | Cassinelli | |
| 2003/0109908 A1 | 6/2003 | Lachenbruch et al. | |
| 2003/0177584 A1 | 9/2003 | Boyd | |
| 2003/0194546 A1 | 10/2003 | McCabe | |
| 2003/0207634 A1 | 11/2003 | Holeschovsky | |
| 2004/0010855 A1 | 1/2004 | Piraino | |
| 2004/0049856 A1* | 3/2004 | Chae | A47C 27/081 5/711 |
| 2004/0126558 A1 | 7/2004 | Williams et al. | |
| 2004/0133987 A1 | 7/2004 | Reeder et al. | |
| 2004/0137212 A1 | 7/2004 | Ochoa et al. | |
| 2004/0172766 A1* | 9/2004 | Formenti | A47C 27/148 5/718 |
| 2004/0187217 A1* | 9/2004 | Barman | A47C 27/053 5/716 |
| 2004/0226099 A1 | 11/2004 | Pearce | |
| 2005/0017396 A1 | 1/2005 | Pearce et al. | |
| 2005/0039264 A1* | 2/2005 | Barman | A47C 27/053 5/717 |
| 2005/0115003 A1 | 6/2005 | Torbet et al. | |
| 2005/0188467 A1 | 9/2005 | Woolfson | |
| 2005/0192365 A1 | 9/2005 | Strandburg et al. | |
| 2005/0192368 A1 | 9/2005 | Miller et al. | |
| 2005/0278852 A1* | 12/2005 | Wahrmund | A47C 27/05 5/636 |
| 2006/0068169 A1 | 3/2006 | Hanada | |
| 2006/0123553 A1 | 6/2006 | Jansen | |
| 2006/0127648 A1 | 6/2006 | De Luca | |
| 2006/0194892 A1 | 8/2006 | Ramesh et al. | |
| 2006/0195988 A1 | 9/2006 | Gladney | |
| 2006/0272098 A1 | 12/2006 | Hochschild | |
| 2006/0288490 A1 | 12/2006 | Mikkelsen et al. | |
| 2006/0290039 A1 | 12/2006 | Cao et al. | |
| 2007/0022540 A1 | 2/2007 | Hochschild | |
| 2007/0044906 A1 | 3/2007 | Park | |
| 2007/0094801 A1 | 5/2007 | Kuo | |
| 2007/0204407 A1* | 9/2007 | Lee | A47C 27/04 5/720 |
| 2007/0209120 A1 | 9/2007 | Clark | |
| 2007/0221890 A1 | 9/2007 | Gan | |
| 2007/0246157 A1* | 10/2007 | Mason | A47C 27/085 156/242 |
| 2007/0289069 A1 | 12/2007 | Wells | |
| 2008/0014387 A1 | 1/2008 | Murphy | |
| 2008/0083069 A1* | 4/2008 | Dell'Accio | A47C 27/053 5/740 |
| 2008/0093784 A1* | 4/2008 | Rawls-Meehan | A47C 7/027 267/80 |
| 2008/0201860 A1 | 8/2008 | Malzi | |
| 2008/0299379 A1 | 12/2008 | Maurer et al. | |
| 2008/0313815 A1 | 12/2008 | Guesquiere | |
| 2009/0011203 A1 | 1/2009 | Mock et al. | |
| 2009/0013472 A1 | 1/2009 | Koffler et al. | |
| 2009/0047495 A1 | 2/2009 | Hubbs | |
| 2009/0139033 A1 | 6/2009 | Gladney | |
| 2009/0142551 A1 | 6/2009 | Fox et al. | |
| 2009/0183314 A1 | 7/2009 | Demoss | |
| 2009/0217457 A1 | 9/2009 | Graebe et al. | |
| 2009/0291290 A1 | 11/2009 | Zhang et al. | |
| 2010/0021690 A1 | 1/2010 | McCarthy | |
| 2010/0030316 A1 | 2/2010 | Prindle et al. | |
| 2010/0047550 A1 | 2/2010 | Prissok et al. | |
| 2010/0143652 A1 | 6/2010 | Stockton et al. | |
| 2010/0146706 A1 | 6/2010 | Siegner et al. | |
| 2010/0183847 A1 | 7/2010 | Pearce et al. | |
| 2010/0218319 A1 | 9/2010 | Moule et al. | |
| 2010/0221521 A1 | 9/2010 | Wagner et al. | |
| 2010/0223730 A1 | 9/2010 | Pearce et al. | |
| 2010/0223732 A1 | 9/2010 | Allman et al. | |
| 2010/0223734 A1 | 9/2010 | Oh | |
| 2010/0229308 A1 | 9/2010 | Pearce et al. | |
| 2010/0237082 A1 | 9/2010 | Fernandez | |
| 2010/0304104 A1 | 12/2010 | Nagasaki et al. | |
| 2010/0319137 A1* | 12/2010 | Witherell | A47C 27/04 5/717 |
| 2010/0325806 A1 | 12/2010 | Letton et al. | |
| 2011/0049327 A1 | 3/2011 | Young et al. | |
| 2011/0061168 A1 | 3/2011 | Farley | |
| 2011/0154576 A1 | 6/2011 | Warren et al. | |
| 2011/0179579 A1 | 7/2011 | Henderson et al. | |
| 2011/0197363 A1 | 8/2011 | Kokenes et al. | |
| 2011/0252572 A1 | 10/2011 | Morrison | |
| 2012/0027982 A1* | 2/2012 | Lee | B29C 44/14 428/71 |
| 2012/0167312 A1 | 7/2012 | Sobran et al. | |
| 2012/0180225 A1 | 7/2012 | Gladney et al. | |
| 2012/0233784 A1 | 9/2012 | Wood | |
| 2012/0272457 A1 | 11/2012 | Allman et al. | |
| 2012/0284928 A1 | 11/2012 | Henderson et al. | |
| 2013/0043628 A1 | 2/2013 | Pearce et al. | |
| 2013/0061395 A1 | 3/2013 | Karl et al. | |
| 2013/0081209 A1 | 4/2013 | Young et al. | |
| 2013/0091634 A1 | 4/2013 | Shearon | |
| 2013/0098791 A1 | 4/2013 | Saunders et al. | |
| 2013/0119574 A1 | 5/2013 | Allman et al. | |
| 2013/0174350 A1 | 7/2013 | Allman et al. | |
| 2013/0263380 A1 | 10/2013 | Young et al. | |
| 2013/0283538 A1 | 10/2013 | Young et al. | |
| 2014/0096324 A1* | 4/2014 | LaFlamme | A47C 27/15 5/691 |
| 2014/0130265 A1 | 5/2014 | Lauer et al. | |
| 2014/0143955 A1 | 5/2014 | Nishimura et al. | |
| 2014/0165292 A1 | 6/2014 | Gladney | |
| 2014/0201925 A1 | 7/2014 | Tursi, Jr. et al. | |
| 2014/0208521 A1 | 7/2014 | Farnham | |
| 2014/0346718 A1 | 11/2014 | DeFranks | |
| 2015/0026897 A1 | 1/2015 | Chunglo | |
| 2015/0040327 A1 | 2/2015 | Mikkelsen | |
| 2015/0101127 A1 | 4/2015 | Winton | |
| 2015/0107027 A1 | 4/2015 | Gladney | |
| 2016/0066702 A1 | 3/2016 | DiMarco | |

FOREIGN PATENT DOCUMENTS

| | | |
|---|---|---|
| CN | 2302709 Y | 1/1999 |
| CN | 1233444 A | 11/1999 |
| CN | 2432041 Y | 5/2001 |
| CN | 2841067 Y | 11/2006 |
| DE | 3937214 A1 | 5/1991 |
| EP | 0349620 A1 | 1/1990 |
| EP | 0209453 B2 | 9/1993 |
| EP | 0996654 B1 | 2/2004 |
| EP | 1825996 A1 | 8/2007 |
| EP | 1865812 A1 | 12/2007 |
| EP | 1914274 A1 | 4/2008 |
| EP | 2095745 A1 | 9/2009 |
| EP | 2247223 B1 | 3/2013 |
| EP | 2801464 A1 | 11/2014 |
| EP | 2806771 A4 | 3/2015 |
| GB | 1423541 A | 2/1976 |
| GB | 2225229 A | 5/1990 |
| JP | 2005087639 A | 4/2005 |
| WO | 9514136 A1 | 5/1995 |
| WO | 9522922 A1 | 8/1995 |
| WO | 02075203 A1 | 9/2002 |
| WO | 02077513 A1 | 10/2002 |
| WO | 2004041659 A2 | 5/2004 |
| WO | 2008100728 A2 | 8/2008 |
| WO | 2009014657 A1 | 1/2009 |
| WO | 2010075231 A1 | 7/2010 |
| WO | 2011150080 A1 | 12/2011 |
| WO | 2012076978 A1 | 6/2012 |
| WO | 2012094466 A1 | 7/2012 |
| WO | 2012094468 A1 | 7/2012 |
| WO | 2012097120 A3 | 7/2012 |
| WO | 2012145320 A1 | 10/2012 |
| WO | 2012155131 A1 | 11/2012 |
| WO | 2012155132 A1 | 11/2012 |
| WO | 2013012904 A1 | 1/2013 |

(56) References Cited

FOREIGN PATENT DOCUMENTS

| WO | 2013040543 A2 | 3/2013 |
|---|---|---|
| WO | 2013059767 A1 | 4/2013 |
| WO | 2013106066 A1 | 7/2013 |
| WO | 2013112176 A1 | 8/2013 |
| WO | 2013112840 A1 | 8/2013 |
| WO | 2014013083 A1 | 1/2014 |
| WO | 2014066078 A2 | 5/2014 |
| WO | 2014066078 A3 | 5/2014 |
| WO | 2014142959 A1 | 9/2014 |

OTHER PUBLICATIONS

International Preliminary Report on Patentability for PCT/US2014/035250, dated Nov. 5, 2015, 6 pages.
First Office Action for Canadian Patent Application No. 2,753,914, dated Dec. 29, 2015, 3 pages.
European Search Report for European Patent Application No. 14186707.7, dated Feb. 11, 2015, 6 pages.
Notice of Allowance for U.S. Appl. No. 29/436,782 dated Jul. 8, 2013, 8 pages.
Notice of Allowance for U.S. Appl. No. 29/413,103 dated Jul. 9, 2013, 8 pages.
Notice of Allowance for U.S. Appl. No. 29/428,120 dated Jul. 23, 2013, 7 pages.
Non-final Office Action for U.S. Appl. No. 29/426,274 dated Sep. 13, 2013, 5 pages.
Notice of Allowance for U.S. Appl. No. 29/466,455 dated Dec. 16, 2013, 8 pages.
Notice of Allowance for U.S. Appl. No. 29/466,455 dated Feb. 7, 2014, 8 pages.
Notice of Allowance for U.S. Appl. No. 29/436,784 dated Feb. 11, 2014, 6 pages.
Notice of Allowance for U.S. Appl. No. 29/436,797 dated Feb. 11, 2014, 6 pages.
Advisory Action for U.S. Appl. No. 13/026,979 dated Jan. 14, 2014, 2 pages.
International Search Report for PCT/US2013/067427 dated Mar. 18, 2014, 10 pages.
International Preliminary Report on Patentability for PCT/US2012/057917 dated Apr. 10, 2014, 10 pages.
International Search Report and Written Opinion for PCT/US2014/035250, dated Sep. 5, 2014, 7 pages.
Advisory Action for U.S. Appl. No. 12/893,265 dated Apr. 7, 2014, 3 pages.
Non-final Office Action for U.S. Appl. No. 12/893,265 dated Jun. 27, 2014, 10 pages.
Kelmpner, Daniel et al., "3.3 Open- and Closed-Cell Foamed Plastics," in Handbook of Polymeric Foam and Foam Technology, Second Edition, Hanser Gardner Publications, Inc., Cincinnati, OH, Apr. 2004, pp. 22, 39 and 59.
Smock, D., "One-step SkinForm process went live at NPE2012," Plasticstoday.com, Apr. 13, 2012, 2 pages, Accessed Apr. 18, 2012.
Canadian Office Action for Canadian patent application 2,783,886 dated Mar. 21, 2013, 3 pages.
Canadian Office Action for Canadian patent application 2,783,886 dated Dec. 9, 2013, 2 pages.
Chinese Office Action for patent application 20102187662.1 dated Oct. 21, 2010, 3 pages.
European Search Report for European Patent Application No. 10749317.3 dated Oct. 30, 2012, 7 pages.
Examination Report for European Patent Application 10749317.3 dated Nov. 25, 2013, 5 pages.
International Preliminary Report on Patentability for PCT/US2011/024759 dated Aug. 14, 2012, 8 pages.
International Search Report and Written Opinion for PCT/US2011/024759 dated Apr. 7, 2011, 10 pages.
International Search Report for PCT/US2010/040003 dated Aug. 30, 2010, 10 pages.
Invitation to Pay Additional Fees for PCT/US2012/035564 dated Jan. 17, 2013, 7 pages.
International Search Report for PCT/US2012/057917 dated Dec. 21, 2012, 11 pages.
Official Action for Mexican patent application MX/a/2011/009080 dated Mar. 22, 2013, 6 pages.
Non-final Office Action for U.S. Appl. No. 12/823,653 dated Mar. 7, 2012, 6 pages.
Non-final Office Action for U.S. Appl. No. 12/716,804 dated Jun. 21, 2012, 10 pages.
Non-final Office Action for U.S. Appl. No. 12/893,265 dated May 15, 2012, 10 pages.
Notice of Allowance for U.S. Appl. No. 12/716,804 dated Dec. 11, 2012, 9 pages.
Non-final Office Action for U.S. Appl. No. 29/413,103 dated Jan. 8, 2013, 5 pages.
International Search Report for PCT/US2012/035564 dated Mar. 26, 2013, 13 pages.
International Preliminary Report on Patentability for PCT/US2012/035564 dated Nov. 7, 2013, 8 pages.
Notice of Allowance for U.S. Appl. No. 29/436,783 dated Mar. 14, 2013, 6 pages.
Non-final Office Action for U.S. Appl. No. 29/436,793 dated Mar. 15, 2013, 5 pages.
Non-final Office Action for U.S. Appl. No. 29/436,801 dated Mar. 15, 2013, 6 pages.
Non-final Office Action for U.S. Appl. No. 29/436,831 dated Mar. 15, 2013, 5 pages.
Non-final Office Action for U.S. Appl. No. 29/436,833 dated Mar. 15, 2013, 5 pages.
Non-final Office Action for U.S. Appl. No. 29/436,847 dated Mar. 15, 2013, 5 pages.
Non-final Office Action for U.S. Appl. No. 29/436,860 dated Mar. 15, 2013, 5 pages.
Non-final Office Action for U.S. Appl. No. 29/436,864 dated Dec. 13, 2013, 6 pages.
Final Office Action for U.S. Appl. No. 12/893,265 dated Mar. 15, 2013, 12 pages.
Final Office Action for U.S. Appl. No. 12/893,265 dated Nov. 4, 2013, 10 pages.
Notice of Allowance for U.S. Appl. No. 29/436,781 dated Mar. 19, 2013, 7 pages.
Notice of Allowance for U.S. Appl. No. 29/436,786 dated Mar. 19, 2013, 8 pages.
Notice of Allowance for U.S. Appl. No. 29/436,789 dated Dec. 26, 2013, 8 pages.
Non-final Office Action for U.S. Appl. No. 29/436,792 dated Mar. 19, 2013, 5 pages.
Non-final Office Action for U.S. Appl. No. 29/436,806 dated Mar. 21, 2013, 6 pages.
Notice of Allowance for U.S. Appl. No. 29/436,781 dated May 24, 2013, 8 pages.
Notice of Allowance for U.S. Appl. No. 29/436,782 dated May 24, 2013, 8 pages.
Notice of Allowance for U.S. Appl. No. 29/436,783 dated May 28, 2013, 8 pages.
Notice of Allowance for U.S. Appl. No. 29/436,786 dated May 28, 2013, 8 pages.
Notice of Allowance for U.S. Appl. No. 29/436,787 dated May 13, 2013, 8 pages.
Notice of Allowance for U.S. Appl. No. 29/436,790 dated May 28, 2013, 8 pages.
Non-final Office Action for U.S. Appl. No. 29/436,795 dated May 23, 2013, 6 pages.
Non-final Office Action for U.S. Appl. No. 29/436,799 dated May 23, 2013, 6 pages.
Non-final Office Action for U.S. Appl. No. 29/436,842 dated May 23, 2013, 6 pages.
Notice of Allowance for U.S. Appl. No. 29/413,103 dated May 2, 2013, 7 pages.
Non-final Office Action for U.S. Appl. No. 29/426,274 dated May 14, 2013, 4 pages.

(56) References Cited

OTHER PUBLICATIONS

Non-final Office Action for U.S. Appl. No. 13/026,979 dated May 17, 2013, 11 pages.
Final Office Action for U.S. Appl. No. 13/026,979 dated Nov. 8, 2013, 9 pages.
Notice of Allowance for U.S. Appl. No. 29/436,787 dated Jul. 5, 2013, 8 pages.
Notice of Allowance for U.S. Appl. No. 29/436,790 dated Jul. 5, 2013, 8 pages.
Non-Final Office Action for U.S. Appl. No. 13/732,660, dated Jul. 22, 2015, 5 pages.
Non-Final Office Action for U.S. Appl. No. 13/458,239 dated Dec. 1, 2014, 11 pages.
European Examination Report for European Patent Application No. 12775333.3, dated Dec. 3, 2014, 4 pages.
Non-Final Office Action for U.S. Appl. No. 14/499,588, dated Sep. 24, 2015, 18 pages.
Final Office Action for U.S. Appl. No. 13/458,239, dated Oct. 28, 2015, 16 pages.
Official Action for Mexican Patent Application MX/a/2013/012272, dated Oct. 20, 2015, 8 pages.
Non-Final Office Action for U.S. Appl. No. 13/630,435, dated May 6, 2015, 14 pages.
International Preliminary Report on Patentability for PCT/US2013/067427, dated May 21, 2015, 9 pages.
Examination Report for European Patent Application 10749317.3 dated Apr. 14, 2016, 4 pages.
Examination Report for European Patent Application No. 12775333.3, dated May 11, 2016, 3 pages.

\* cited by examiner

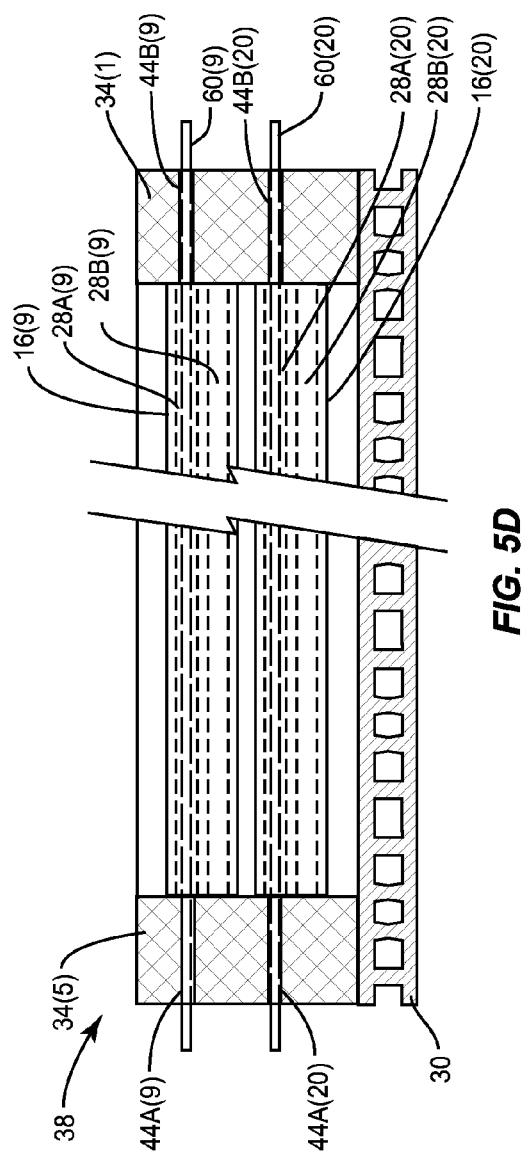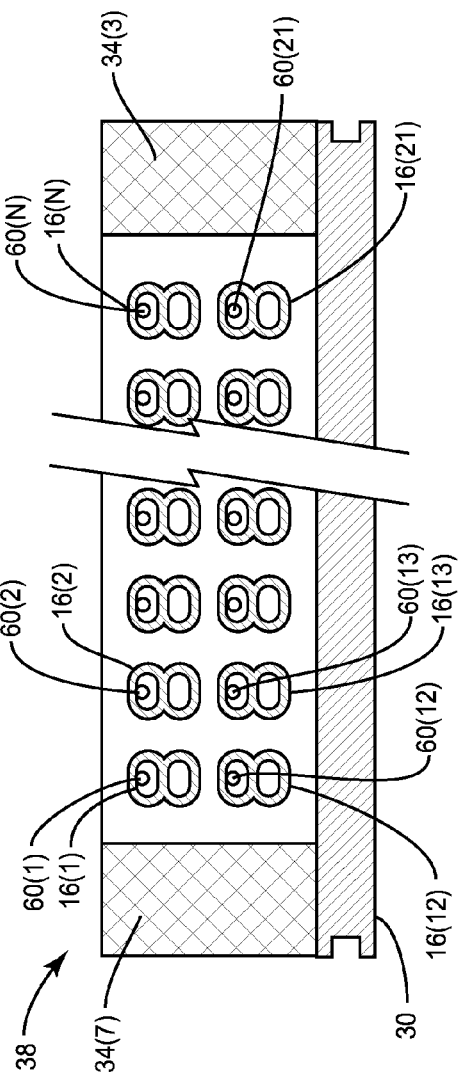
FIG. 5D
FIG. 5E

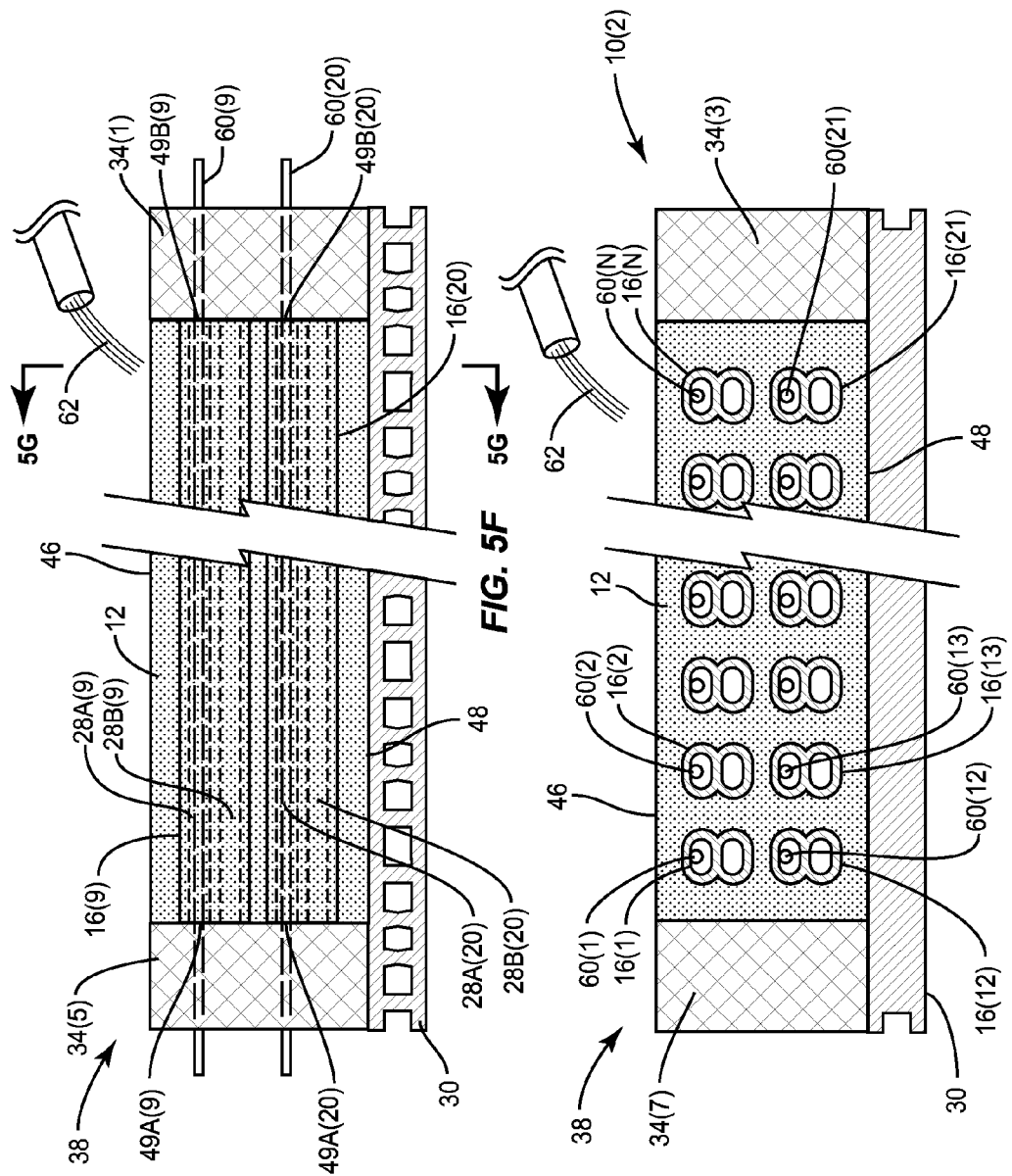

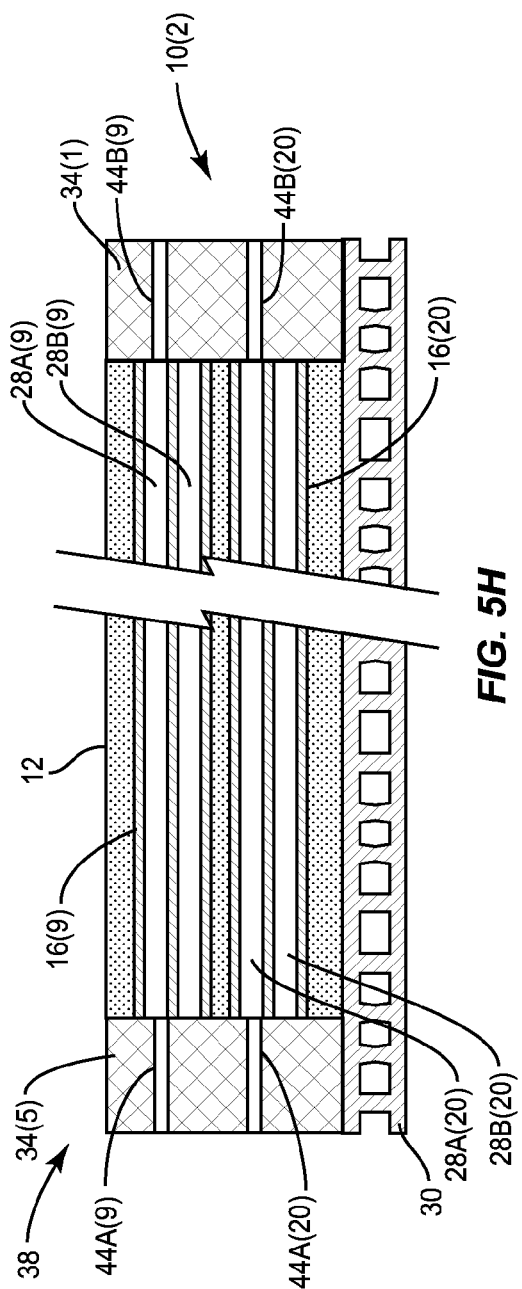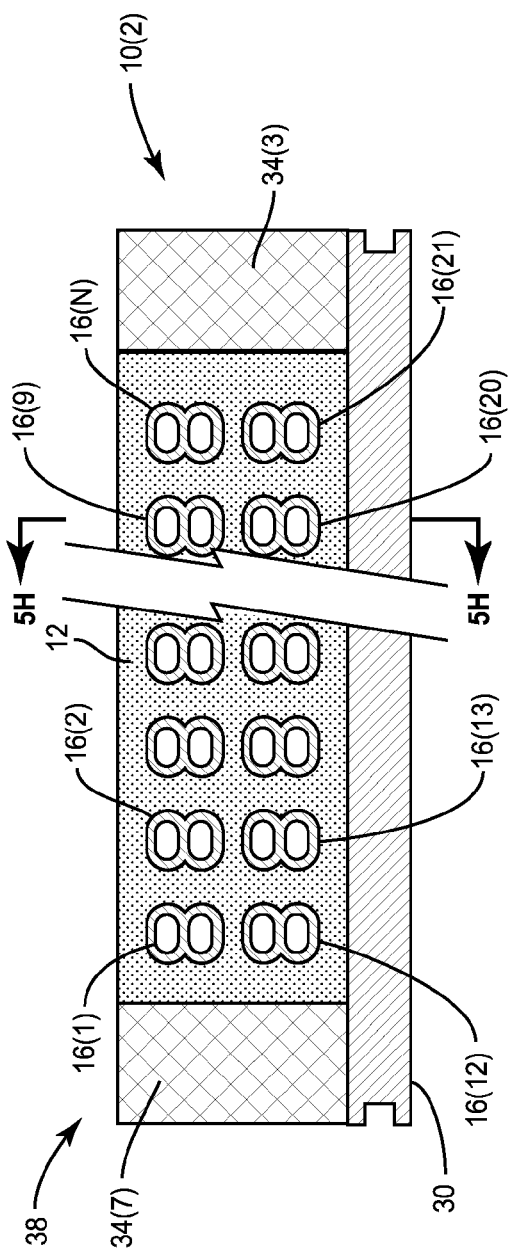

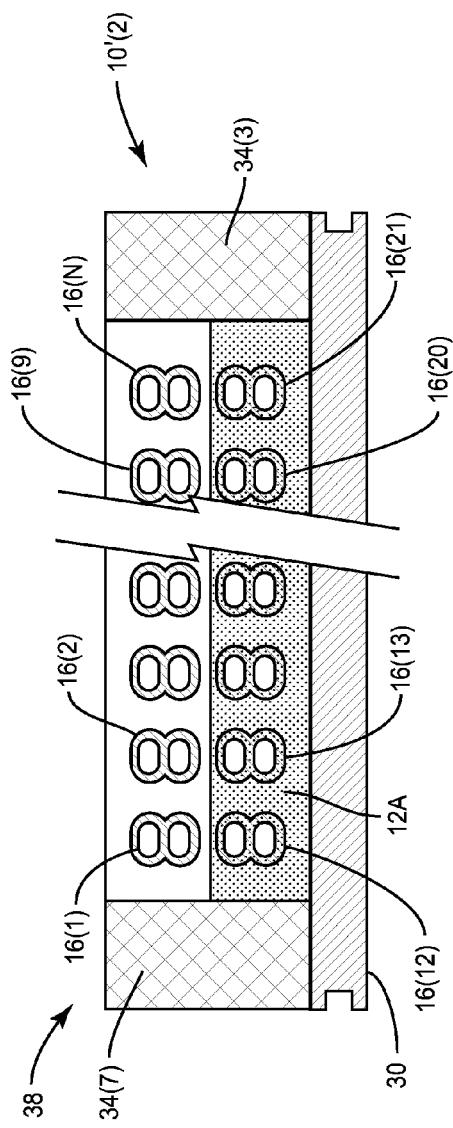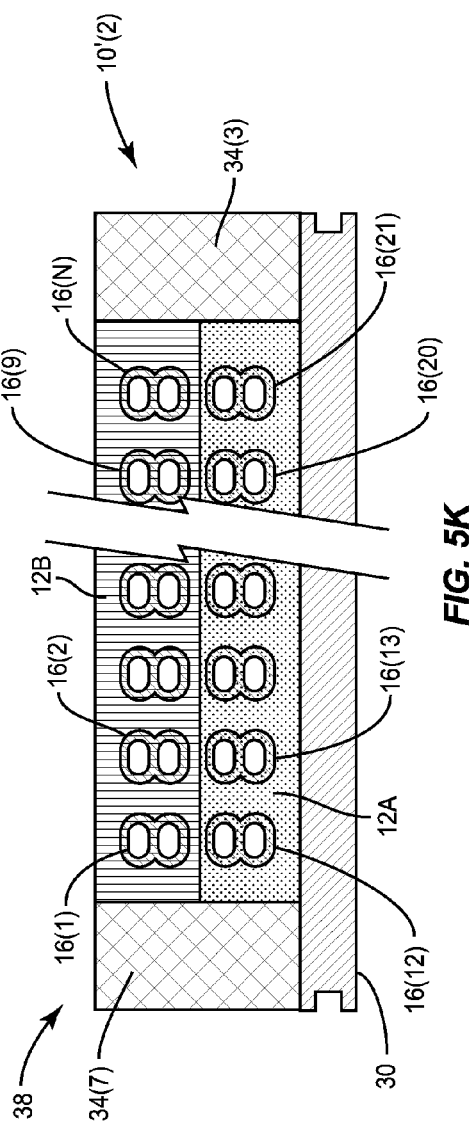

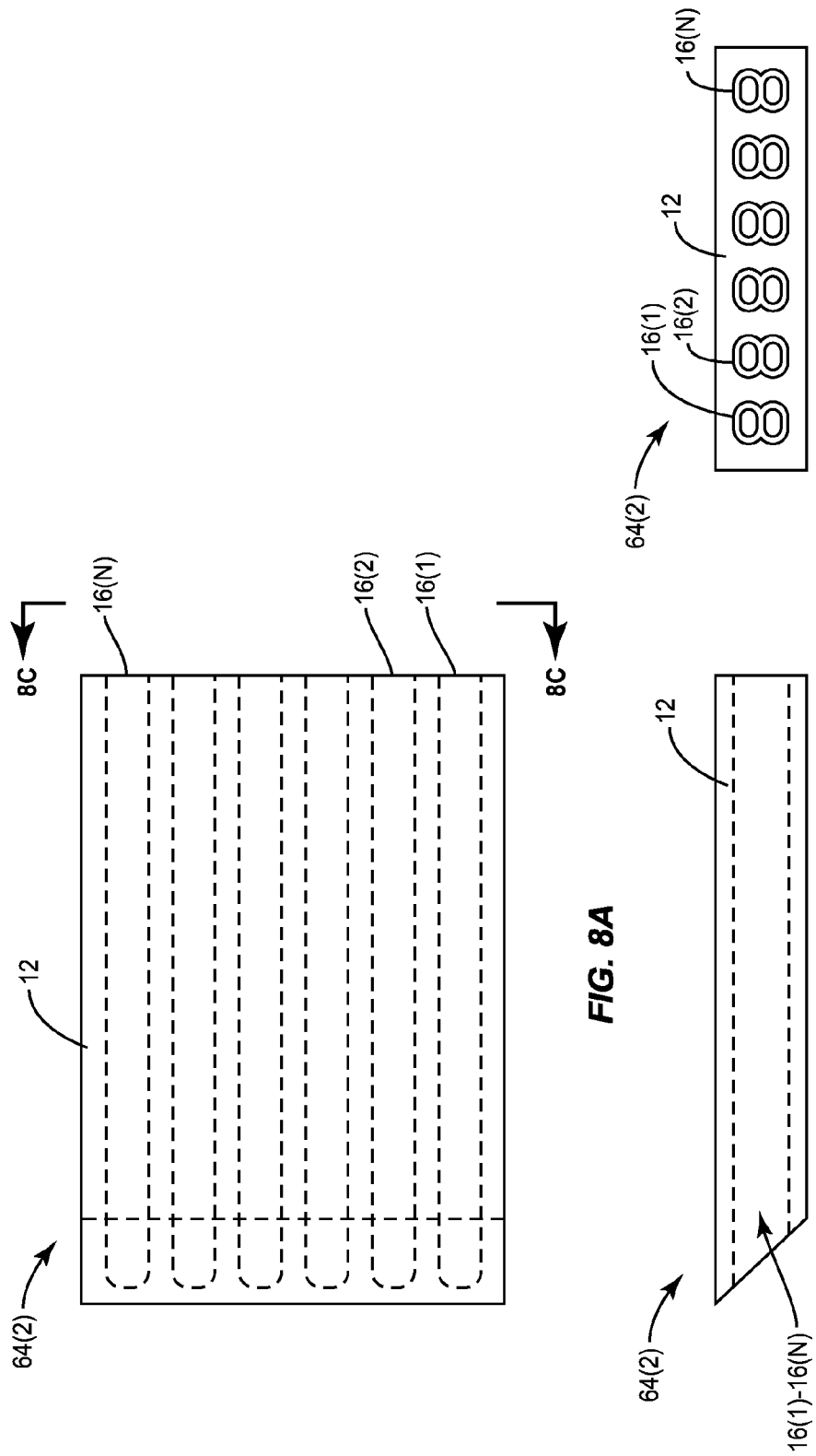

CUSHIONING ASSEMBLIES WITH THERMOPLASTIC ELEMENTS ENCAPSULATED IN THERMOSET PROVIDING CUSTOMIZABLE SUPPORT AND AIRFLOW, AND RELATED METHODS

PRIORITY APPLICATION

The present application claims priority to U.S. Patent Application Ser. No. 61/816,417 filed on Apr. 26, 2013 entitled "MATTRESS ASSEMBLIES WITH THERMOPLASTIC ELEMENTS ENCAPSULATED IN THERMOSET PROVIDING CUSTOMIZABLE SUPPORT AND AIRFLOW, AND RELATED METHODS," which is incorporated herein by reference in its entirety.

FIELD OF DISCLOSURE

The field of the disclosure relates generally to assemblies, systems, and related methods providing support, including perimeter, edge, side, and internal support, which may be employed in bedding.

BACKGROUND

Support structures, such as mattresses, may include several foam layers of varying thicknesses to provide a support and cushioning characteristic desired by users. For example, a soft layer of foam may be situated close to the user to provide soft cushioning. A higher density layer of foam may be situated further away from the user to provide support as the whole weight of the user is applied to the support structure. The layers of foam are conventionally homogeneous structures manufactured using an extrusion or molding technique.

Users regularly desire a more complex cushioning characteristic than is often provided by homogeneous foam layers. For example, different parts of the user's body have different weights, and thereby a support structure made up of homogeneous mattress layers is difficult and expensive to customize to provide more support for the different parts of the user's body. Consistent with customization, more support for a user's torso is desired than for a user's legs, which are typically not as heavy as the torso. Foam material providing support is typically more dense and expensive than the softer layers of foam needed to support lighter parts of the user's body, such as the legs. A conventional homogeneous-foam-layer supporting structure provides the more costly foam material substantially across the entire mattress, thus making the structure more expensive than required or needed.

Further, there are heat and humidity issues often associated with such conventional support structures. Unlike innerspring mattresses, cushion structures with foam layers often trap heat and humidity within the foam layers, which may cause discomfort for some users. The heat and humidity may cause odors that may be undesirable within the support structure when the air is allowed to remain stagnant.

What is needed is a foam cushioning structure that is customizable to provide support to the user where needed, yet is lightweight, and reduces heat and humidity, which can cause undesirable odors.

SUMMARY OF THE DETAILED DESCRIPTION

Embodiments disclosed herein include cushioning assemblies with thermoplastic elements encapsulated in thermoset providing customizable support and airflow. For example, the cushioning assembly may be a mattress assembly, seat assembly or any other cushioning assembly. A cushioning assembly provides cushioning and support for a user. Thermoplastic elements are encapsulated within a thermoset matrix to provide additional support at specific sections of the cushioning assembly. The shape and location of the thermoplastic elements may be configured to provide the support and cushioning characteristics desired by a user. The thermoplastic elements may include air passageways in communication with the outside. In this manner, support is provided precisely where needed for the user, the weight and expense of the cushioning assembly is reduced by eliminating expensive redundant support, and the heat and humidity that can cause user discomfort is reduced.

One embodiment of the disclosure relates to a method of creating a cushioning assembly. The method comprises extruding at least one thermoplastic profile. The method also comprises disposing the at least one thermoplastic profile within an enclosure by suspending the at least one thermoplastic profile with at least one removable elongated member. The method also comprises dispensing thermoset material within the enclosure to encapsulate the at least one thermoplastic profile to form a thermoset matrix. In this manner, the cushioning assembly provides additional support to the user in a location of the thermoplastic profile.

An additional embodiment of the disclosure relates to a cushioning assembly. The cushioning assembly comprises a foam base supporting a mattress core disposed adjacent to a top side of the foam base. The cushioning assembly also comprises at least one foam side support member configured to be disposed adjacent a periphery portion of the cushioning core to provide side support for the cushioning core. The at least one side support is supported by the foam base. The cushioning assembly also comprises the cushioning core comprising at least one thermoplastic profile secured within a thermoset matrix by an attachment disposed completely around a longitudinal exterior surface of each of the at least one thermoplastic profile. The thermoset matrix is configured to transfer to, and receive from, the at least one thermoplastic profile a weight of the user. In this manner, a location and shape of the thermoplastic profiles may be selected to provide the characteristic support needed by the user.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF FIGURES

FIGS. 5D and 5E are a front side view and a right side view, respectively, of the enclosure of FIG. 5C with the at least one removable elongated member inserted through sides of the enclosure and the thermoplastic profiles, illustrating the thermoplastic profiles precisely located within the enclosure, consistent with the method of FIG. 4;

FIGS. 5F and 5G are a front side view and a right side view, respectively, of the enclosure of FIG. 5D with the thermoset material of the thermoset matrix being dispensed within the enclosure to encapsulate the thermoplastic profiles and to form a mattress assembly;

FIGS. 5H and 5I are a front side view and a right side view, respectively, of the mattress assembly of FIG. 5F with the at least one removable elongated member removed from the enclosure;

FIGS. 5J and 5K are right side views of another cushioning assembly;

FIGS. 8A-8C are a top view, a front view, and a right side view, respectively, of the core segment of FIG. 7, illustrating the at least one thermoplastic profile encapsulated by the thermoset matrix;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include cushioning assemblies with thermoplastic elements encapsulated in thermoset providing customizable support and airflow. A cushioning assembly for a cushion provides cushioning and support for a user. Thermoplastic elements are encapsulated within a thermoset matrix to provide additional support at specific sections of the cushion. The shape and location of the thermoplastic elements may be configured to provide the support and cushioning characteristics desired by a user. The thermoplastic elements may include air passageways in communication with the outside. In this manner, support is provided precisely where needed for the user, the weight and expense of the cushion is reduced by eliminating expensive redundant support, and the heat and humidity that can cause user discomfort is reduced.

In this regard, concepts for providing additional support to a thermoset matrix by encapsulating a thermoplastic profile will be discussed relative to an exemplary cushioning assembly in the form of a mattress assembly of FIG. 1.

Figure 1:
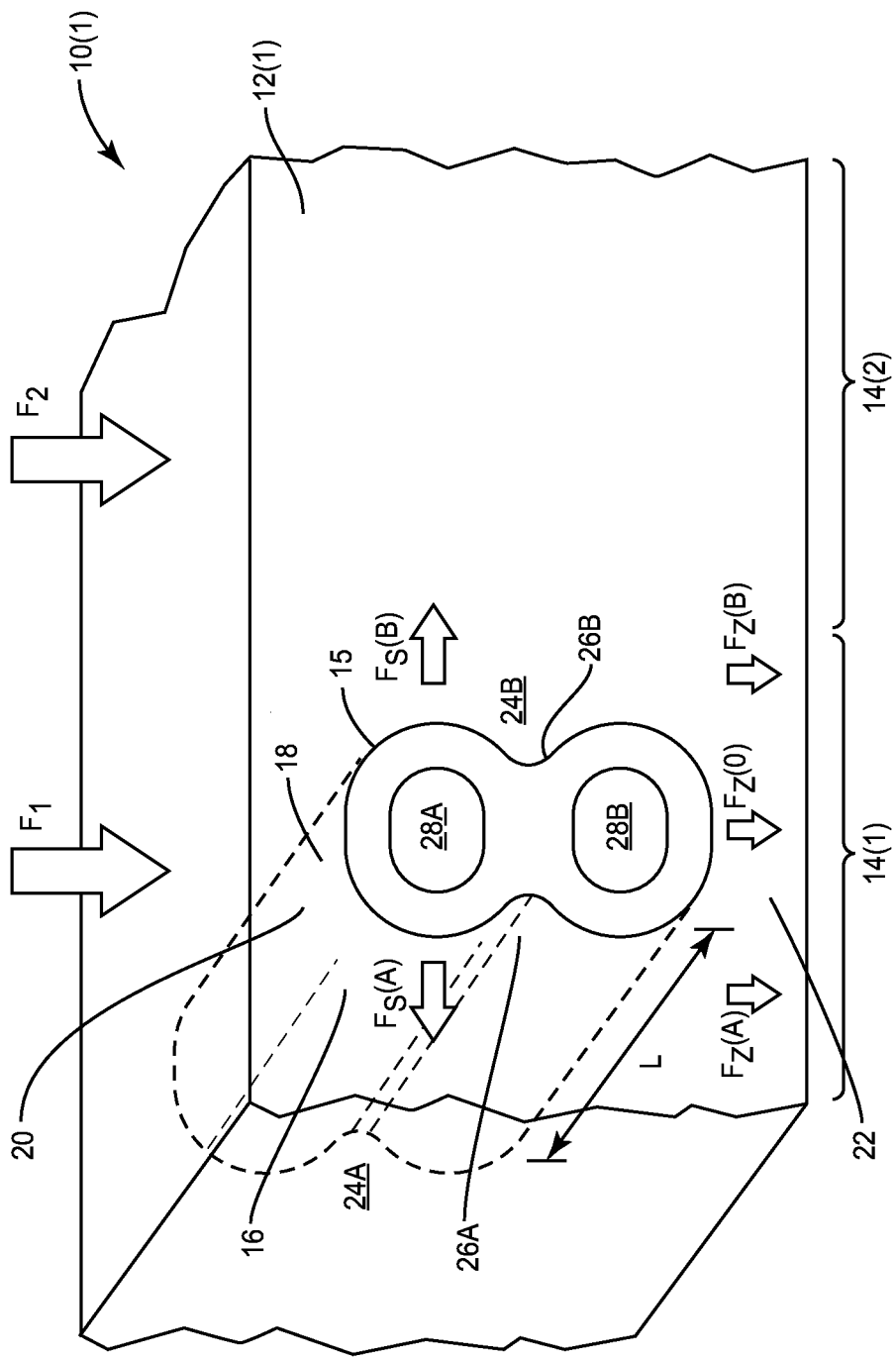
FIG. 1 is a top perspective view of an exemplary cushioning assembly in the form of a mattress assembly comprising a thermoset matrix having a first zone and a second zone, the first zone comprises at least one thermoplastic profile encapsulated therein and is subject to a first force, and the second zone does not include an encapsulated thermoplastic profile disposed therein and is subject to a second force, to illustrate less support in the second zone.

In this regard, FIG. 1 is a top perspective view of a cushioning assembly in the form of a mattress assembly 10(1) comprising a thermoset matrix 12 having a first zone 14(1) and a second zone 14(2). The first zone 14(1) comprises at least one thermoplastic profile 16 encapsulated within the first zone 14(1). Encapsulated as used herein means the thermoplastic profile 16 is in abutment and forms an attachment 15 with the thermoset matrix 12 along a longitudinal exterior surface 18 surrounding the thermoplastic profile 16 and extending along a length $L_1$ of the thermoplastic profile 16. The thermoset matrix 12 is relatively soft and deflects readily in the second zone 14(2) if a force $F_2$ is applied. In this manner, the second zone 14(2) can provide sufficient support for portions of the user that are not as heavy as the torso of the user, for example, the legs of the user.

The first zone 14(1) is different from the second zone 14(2). The first zone 14(1) does not as readily reflect while under a force $F_1$, because the thermoplastic profile 16 has a higher spring constant than the thermoset matrix 12. Specifically, the force $F_1$ is transferred from a portion 20 of the thermoset matrix 12 above the thermoplastic profile 16. The thermoplastic profile 16 deflects less than the thermoset matrix 12 under the force $F_1$ and transfers at least a portion $F_Z(0)$ of the force $F_1$ through a portion 22 of the thermoset matrix 12 below the thermoplastic profile 16. In this manner, the thermoplastic profile 16 may provide more support to the first zone 14(1).

Furthermore, the encapsulation of the thermoplastic profile 16 also provides enhanced support. Specifically, the longitudinal exterior surface 18 of the thermoplastic profile 16 is in abutment with the thermoset matrix 12. As the thermoplastic profile 16 is subject to the force $F_1$, at least one side force $F_S(A)$, $F_S(B)$ is applied to the thermoset matrix 12 at portions 24A, 24B, respectively, of the thermoset matrix 12. The side forces $F_S(A)$, $F_S(B)$ are resisted by the thermoset portions 24A, 24B located laterally to the thermoplastic profile 16, and thereby provide additional resistance of the thermoplastic profile 16 to the force $F_1$. In this manner, encapsulation provides additional support.

Also, the longitudinal exterior surface 18 may be designed with non-vertical sides 26A, 26B. The non-vertical sides 26A, 26B angularly engage the thermoset matrix 12 to allocate the force $F_1$ away from the thermoplastic profile 16, which is stiffer than the thermoset matrix 12. In this manner, the force $F_1$ is dispersed between $F_Z(0)$, $F_Z(A)$, and $F_Z(B)$ to provide more cushioning and less support.

There are other ways to modify the support provided by the mattress assembly 10(1) in the first zone 14(1). The thermoplastic profile 16 may contain at least one longitudinal passageway 28A, 28B. In this way, the longitudinal passageways 28A, 28B may reduce the spring constant of the thermoplastic profile 16 and thereby improve cushioning and reduce support. It is noted that the longitudinal passageways 28A, 28B may also provide a means for ventilation and humidity removal, as discussed later.

Figure 2:
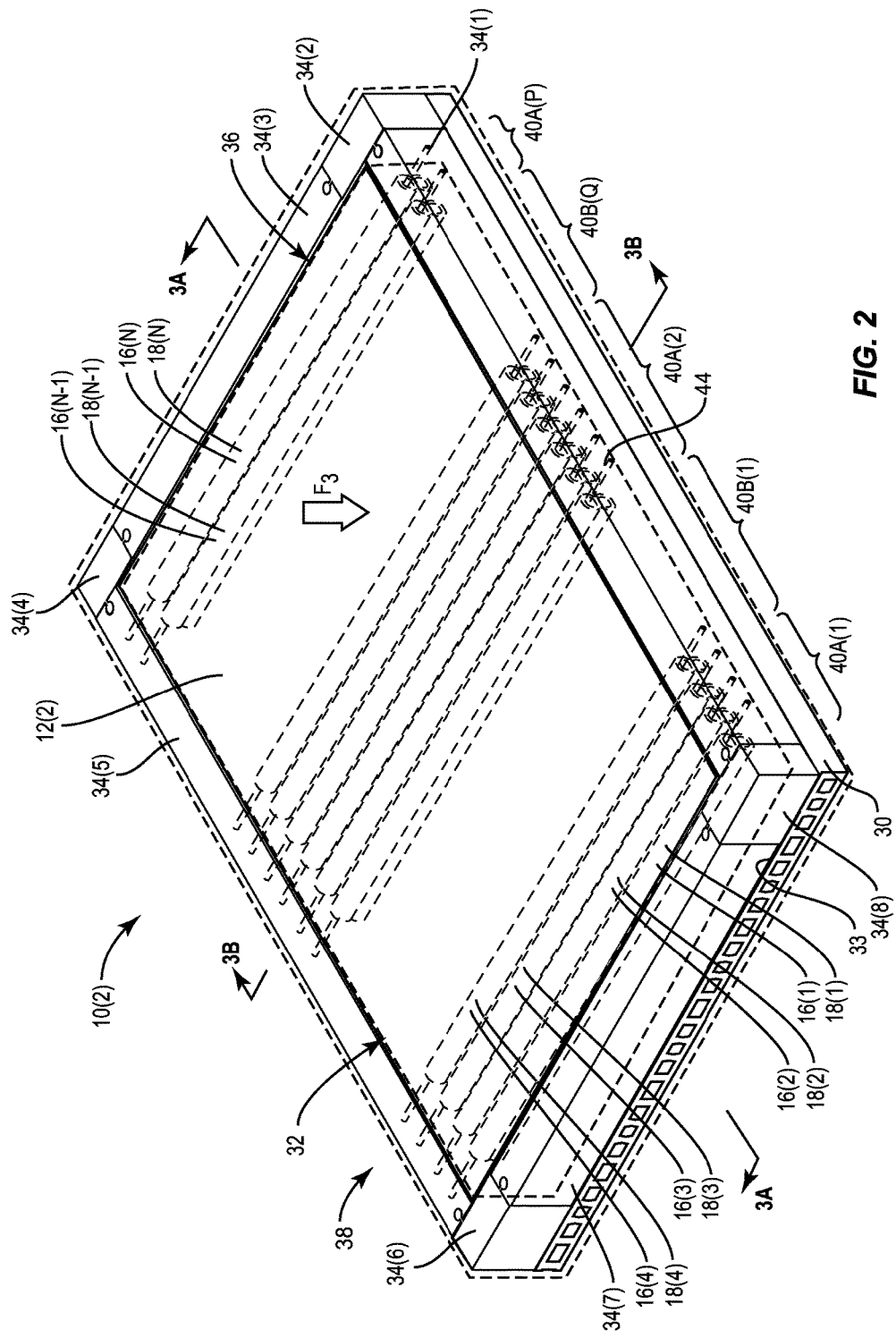
FIG. 2 is a top perspective view of another embodiment of an exemplary cushioning assembly in the form of a mattress assembly depicting at least one side support and a foam base surrounding a cushioning core in the form of a mattress core comprising the at least one thermoplastic profile encapsulated within a thermoplastic matrix, illustrating a precise placement of the at least one thermoplastic profile to provide support to a user.

Now that an exemplary concept of the at least one thermoplastic profile 16 providing support when encapsulated in the thermoset matrix 12 has been introduced, FIG. 2 is a top perspective view of another embodiment of an exemplary cushioning assembly in the form of a mattress assembly 10(2). The mattress assembly 10(2) comprises a foam base 30 supporting a cushioning core in the form of a mattress core 32 disposed adjacent to a top surface 33 of the foam base 30. In this manner, the foam base 30 supports the mattress core 32.

The mattress assembly 10(2) also comprises at least one foam side support member 34(1)-34(8) configured to be disposed adjacent a periphery portion 36 of the mattress core 32 to provide side support for the mattress core 32. The at least one foam side support member 34(1)-34(8) may provide additional support as the user mounts and dismounts the mattress core 32. The at least one foam side support member 34(1)-34(8) also forms an enclosure 38 with the foam base 30 to surround the mattress core 32. In this manner, the mattress core 32 may be protected during use.

The mattress assembly 10(2) also comprises the mattress core 32. The mattress core 32 comprises the at least one thermoplastic profile 16(1)-16(N) encapsulated within the thermoset matrix 12 by the attachment 15 (FIG. 1). The attachment 15 is disposed completely around the longitudinal exterior surface 18(1)-18(N) of each of the at least one thermoplastic profile 16(1)-16(N), respectively. The thermoset matrix 12 is configured to transfer to, and receive from, the at least one thermoplastic profile 16(1)-16(N) a weight $F_3$ of the user. The thermoplastic profiles 16(1)-16(N) may be disposed in support zones 40A(1)-40A(P) of the mattress core 32 to increase support in the support zones 40A(1)-40A(P). However, support zones 40B(1)-40B(Q) of the mattress core 32 may be free of the thermoplastic profiles 16(1)-16(N), and thereby the thermoset matrix 12(2) may provide less support and more cushioning to the user. In this manner, the thermoplastic profiles 16(1)-16(N) may be used to customize the support and cushioning of the mattress assembly 10(2).

Figure 3A:
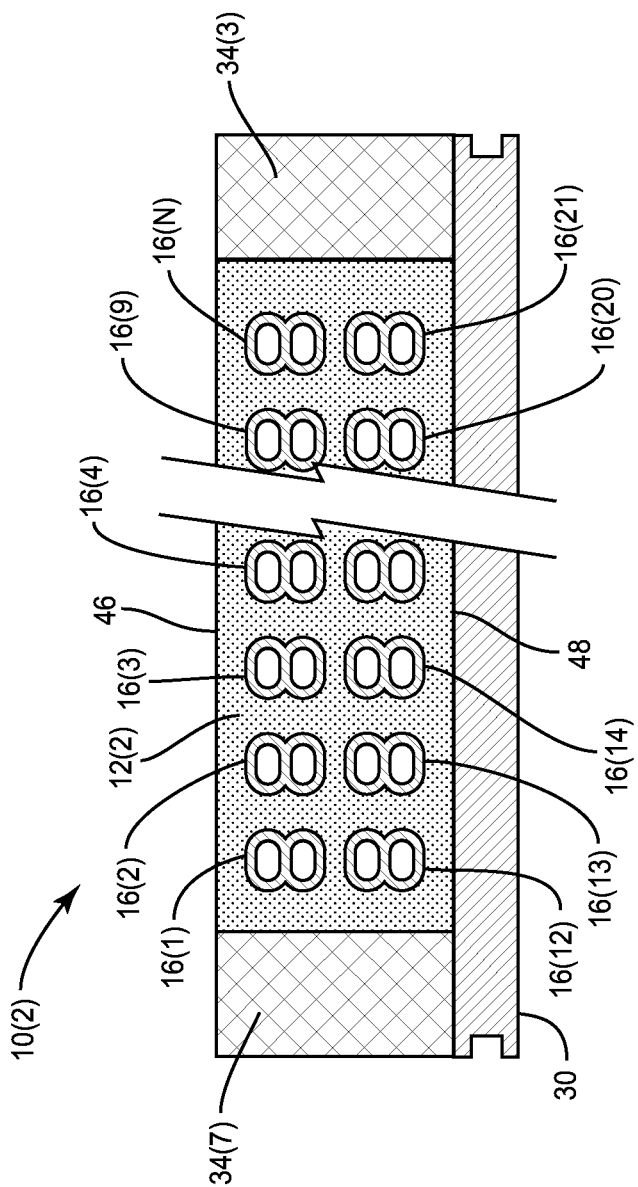
FIGS. 3A and 3B are cutaway right and front side views, respectively, of the mattress assembly of FIG. 2, depicting longitudinal passageways of the thermoplastic profiles of the mattress core, and the mattress core comprises the thermoplastic profiles encapsulated within the thermoset matrix yet enables airflow to the mattress core.
Figure 3B:
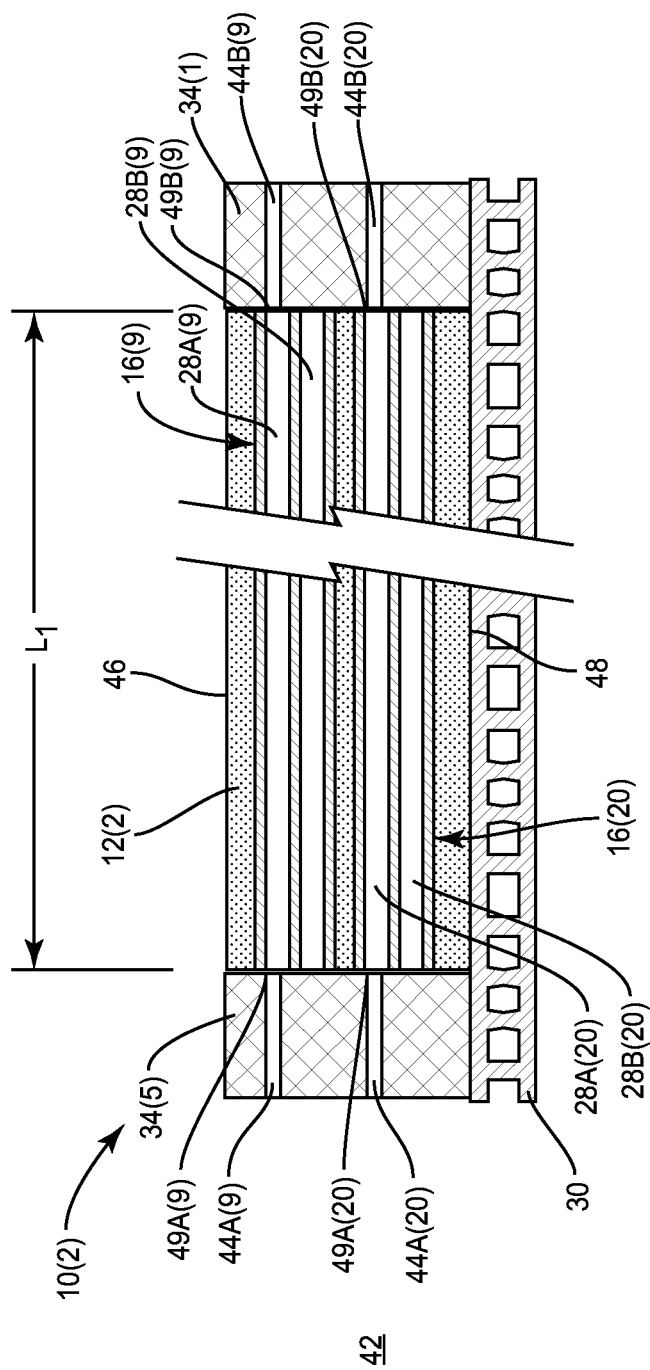

FIGS. 3A and 3B provide more details about the mattress assembly 10(2). FIGS. 3A-3B are cutaway right and front side views, respectively, of the mattress assembly 10(2) of FIG. 2. The thermoplastic profiles 16(1)-16(N) may each comprise at least one longitudinal passageway 28A(1)-28A(N), 28B(1)-28B(N) extending therethrough. Each of the longitudinal passageways 28A(1)-28A(N), 28B(1)-28B(N) contains air in communication with the atmosphere 42 via at least one opening 44A(1)-44A(N), 44B(1)-44B(N) through the foam side support member 34(1)-34(8). In this way, the thermoplastic profiles 16(1)-16(N) may circulate air to minimize stagnant air and humidity that can cause odors.

With continued reference to FIGS. 3A and 3B, it is also noted that the thermoset matrix 12(2) may comprise a top planar surface 46 and a bottom planar surface 48 opposite the top planar surface 46. The top planar surface 46 and the bottom planar surface may 48 be parallel or substantially parallel. In this manner, the thermoset matrix 12(2) may be more easily contained within the enclosure 38 formed of the foam side support members 34(1)-34(8) and the foam base 30.

It is noted that the thermoplastic profiles 16(1)-16(N) may be the length $L_1$ which is a distance between opposite ones of the foam side support members 34(1), 34(5). The length $L_1$ may be selected so that the thermoplastic profiles 16(1)-16(N) abut against the foam side support members 34(1), 34(5) to form at least one seal 49A(1)-49A(N), 49B(1)-49B(N). The seals 49A(1)-49A(N), 49B(1)-49B(N) may be configured to prevent the thermoset matrix 12(2) from entering into the longitudinal passageways 28A(1)-28A(N), 28B(1)-28B(N) during creation of the mattress assembly 10(2). In this manner, the longitudinal passageways 28A(1)-28A(N), 28B(1)-28B(N) may be free from obstructions that might prevent the air contained therein to be in direct airflow communication with the atmosphere 42.

Figure 4:
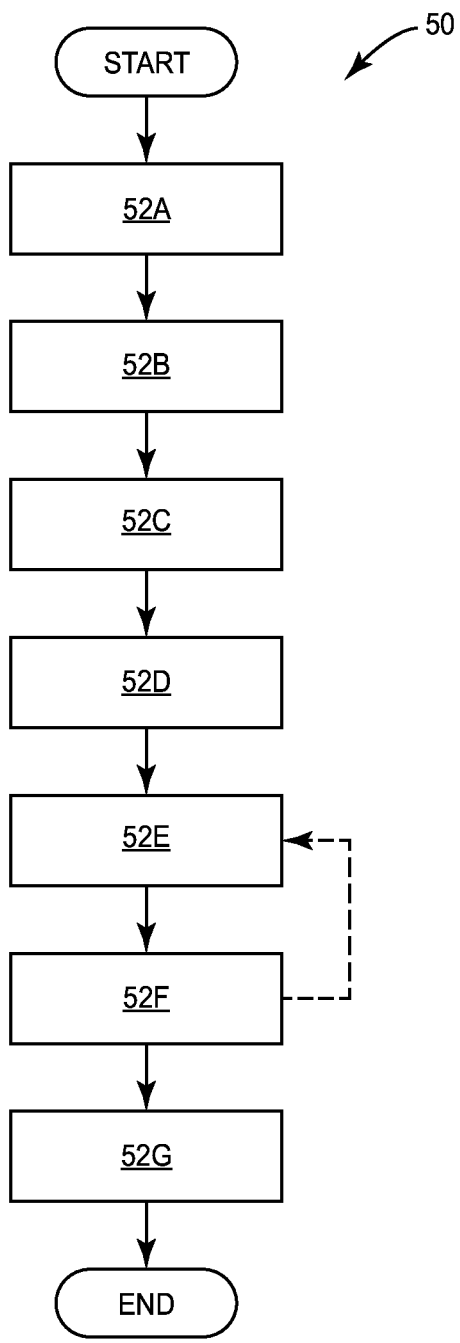
FIG. 4 is a flowchart diagram illustrating an exemplary method for creating a cushioning assembly, the cushioning assembly comprising the thermoplastic profiles encapsulated in the thermoset matrix providing precise support to the user.

Now that concepts for providing additional support to the thermoset matrix 12(1) by encapsulating the thermoplastic profile 16 have been discussed relative to FIG. 1, and the mattress assembly 10(2) has been introduced relative to FIGS. 2-3B, an exemplary process 50 to create the mattress assembly 10(2) is discussed. In this regard, FIG. 4 is a flowchart diagram of the exemplary process 50 of creating the mattress assembly 10(2), the mattress assembly 10(2) comprising the thermoplastic profiles 16(1)-16(N) encapsulated in the thermoset matrix 12 to provide precise support to the user. The process 50 in FIG. 4 comprises blocks 52A-52F and will be described using terminology and information provided above. FIGS. 5A-5I will be discussed relative to blocks 52A-52F in FIG. 4.

Figure 5A:
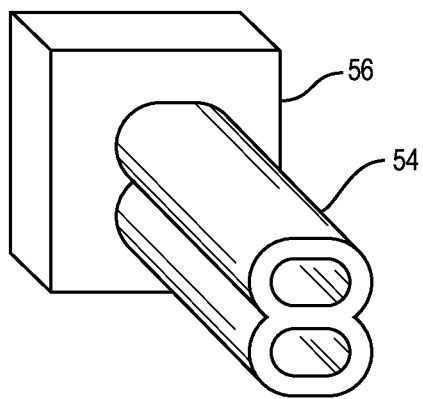
FIG. 5A is a front perspective view of a thermoplastic profile extrusion being extruded from an extrusion device, consistent with the process of FIG. 4.

In this regard, FIG. 5A is a front perspective view of a thermoplastic profile extrusion 54 being extruded from an extrusion device 56 (block 52A in FIG. 4). The thermoplastic profile extrusion 54 may be made of a thermoplastic foam, for example, polyethylene. The thermoplastic profile extrusion 54 may be extruded with the at least one longitudinal passageways 28A, 28B. In this manner, the thermoplastic profile extrusion 54 may be made inexpensively.

Figure 5B:
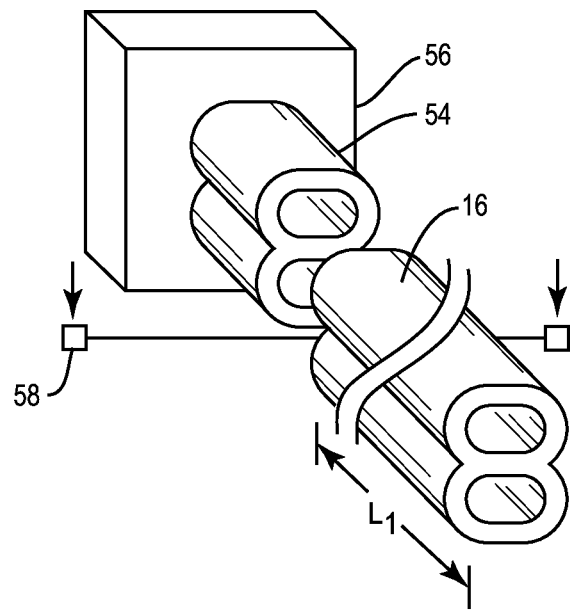
FIG. 5B is a front perspective view of a thermoplastic profile being cut from the thermoplastic profile extrusion of FIG. 5A, consistent with the process of FIG. 4.

FIG. 5B is a front perspective view of the thermoplastic profile 16 being cut from the thermoplastic profile extrusion 54 of FIG. 5A (block 52B in FIG. 4). The thermoplastic profile 16 may be cut to a length $L_1$ (FIG. 3B) corresponding to the distance between the opposite ones of the foam side support members 34(1), 34(5) (FIG. 3B). The thermoplastic profile 16 may be cut with a foam cutter 58, for example, a heated wire or saw. In this manner, repeated a plurality of times, the thermoplastic profiles 16(1)-16(N) may fit between the opposite ones of the foam side support members 34(1), 34(5), and the seals 49A(1)-49A(N), 49B(1)-49B(N) may be formed later as depicted later in FIG. 5F.

Figure 5C:
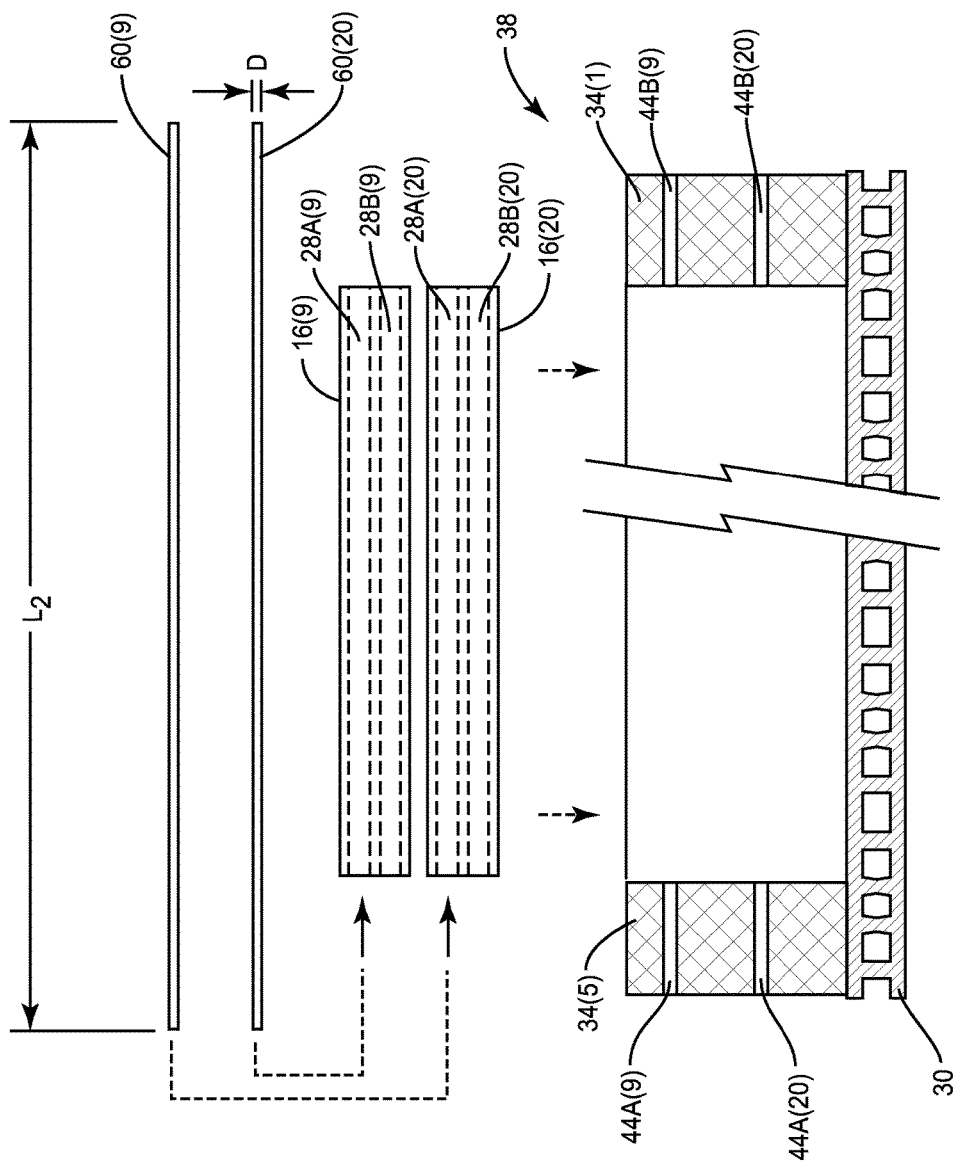
FIG. 5C is a cutaway front side view of an enclosure adjacent and detached from at least one removable elongated member and at least one thermoplastic profile, consistent with the method of FIG. 4.

FIG. 5C is a front side view of the enclosure 38 provided detached from at least one removable elongated member 60(1)-60(N) and the at least one thermoplastic profile 16(1)-16(N) (block 52C in FIG. 4). The removable elongated member 60(1)-60(N) may be a strong, inflexible, and elongated object, for example, a wooden dowel. The removable elongated member 60(1)-60(N) is a rigid or substantially rigid support configured to interface with an internal surface of the at least one thermoplastic profile 16(1)-16(N). The removable elongated member 60(1)-60(N) may be a length $L_2$ which is longer than the length $L_1$. In this way, the removable elongated member 60(1)-60(N) may at least span the length $L_1$ between the opposite ones of the foam side support members 34(1), 34(5). Further, a diameter D (or width) of the removable elongated member 60(1)-60(N) may be configured to fit through the longitudinal passageways 28A(1)-28A(N), 28B(1)-28B(N) of the thermoplastic profiles 16(1)-16(N). In this way, the thermoplastic profiles 16(1)-16(N) may be suspended from the removable elongated members 60(1)-60(N).

With continued reference to FIG. 5C, it is noted that the opposite ones of the foam side support members 34(1), 34(5) may be provided with the openings 44A(1)-44A(N), 44B(1)-44B(N). The openings 44A(1)-44A(N), 44B(1)-44B(N) may be large enough and positioned opposite each other to permit the removable elongated members 60(1)-60(N) to span the length $L_1$ within the enclosure 38. In this manner, the thermoplastic profiles 16(1)-16(N) may be readied to be disposed within the enclosure 38.

FIGS. 5D and 5E are a front side view and a right side view, respectively, of the enclosure 38 of FIG. 5C with the thermoplastic profiles 16(1)-16(N) disposed within the enclosure 38 (block 52D in FIG. 4). Specifically, the thermoplastic profiles 16(1)-16(N) are suspended from the removable elongated members 60(1)-60(N) that have been inserted through the openings 44A(1)-44A(N), 44B(1)-44B(N) of the foam side support members 34(1), 34(5). In this manner, the thermoplastic profiles 16(1)-16(N) may be positioned within the enclosure 38 and are ready to be encapsulated within the thermoset matrix 12.

FIGS. 5F and 5G are a front side view and a right side view, respectively, of the enclosure 38 of FIG. 5D with thermoset material 62 being dispensed within the enclosure 38 to encapsulate the thermoplastic profiles 16(1)-16(N) and to form the thermoset matrix 12 of the mattress assembly 10(2) (block 52E in FIG. 4). An amount of the thermoset material 62 may be dispensed into the enclosure 38 to at least partially fill the enclosure 38 outside of a volume occupied by the thermoplastic profiles 16(1)-16(N). In one embodiment, the thermoset material 62 may be a thermoset foam, for example, a polyurethane foam. The thermoset material 62 may be a slow reacting formula comprising a slow reacting catalyzer. In this manner, the thermoset material 62 may completely fill the enclosure 38 and encapsulate the thermoplastic profiles 16(1)-16(N) before hardening.

It is noted that the thermoset material 62, once dispensed, does not enter the longitudinal passageways 28A(1)-28A(N), 28B(1)-28B(N). The seals 49A(1)-49A(N), 49B(1)-49B(N) prevent the thermoset material 62 from entering the longitudinal passageways 28A(1)-28A(N), 28B(1)-28B(N). In this manner, the removable elongated members 60(1)-60(N) are more easily removed later.

With continued reference to FIGS. 5F and 5G, the thermoset material 62 may cure from a liquid state to a solid state (block 52F in FIG. 4). Curing is a chemical process specific for different types of thermoset material 62 wherein the thermoset material 62 forms cross-linked thermoset structures comprising a solid of the thermoset matrix 12. The thermoset matrix 12 may be formed comprising the top planar surface 46 opposite the bottom planar surface 48. The top planar surface 46 may be parallel or substantially parallel to the bottom planar surface 48. In this manner, the thermoset matrix 12 may be more easily formed by dispensing.

FIGS. 5H and 5I are a front side view and a right side view, respectively, of the mattress assembly 10(2) of FIG. 5F, with the at least one removable elongated member 60(1)-60(N) removed from the enclosure 38 (block 52G in FIG. 4). The removable elongated members 60(1)-60(N), once removed, free the openings 44A(1)-44A(N), 44B(1)-44B(N) of the foam side support members 34(1), 34(5) and the longitudinal passageways 28A(1)-28A(N) of the thermoplastic profiles 16(1)-16(N) from obstruction. In this manner, the air contained within the longitudinal passageways 28A(1)-28A(N) may be in direct fluid communication with the atmosphere, and stagnant air and humidity may be reduced within the mattress assembly 10(2).

In another embodiment of the process 50, as shown by FIGS. 5J and 5K, which are right side views of a cushioning assembly in the form of a mattress assembly 10'(2). The mattress assembly 10'(2) is similar to the mattress assembly 10(2) and only differences will be discussed for clarity and conciseness.

In this regard, with the mattress assembly 10'(2), a first portion of the thermoset material 62 is dispensed into the enclosure 38 and only partially fills the enclosure 38 as depicted in FIG. 5J. The first portion is allowed to cure or partially cure to form a first thermoset matrix layer 12A. Then, as represented by the dashed line pointing with an arrow from block 52F to block 52E of FIG. 4, additional thermoset material 62' is dispensed into the enclosure 38. The additional thermoset material 62' may be of a different density, composition, or formula than the thermoset material 62 which formed the thermoset matrix 62. The additional thermoset material 62' is then allowed to cure to form a second thermoset matrix layer 12B atop the first thermoset matrix layer 12A. The second thermoset matrix layer 12B may be have more cushion or support characteristics than the first thermoset matrix layer 12A due to the different density, composition, or formula of the additional thermoset material. The thermoset matrix 12 of the mattress assembly 10'(2) comprises the first thermoset matrix layer 12A and the second thermoset matrix layer 12B. It is noted that thermoset matrix 12 may have at least one thermoset matrix layer and may have more than two thermoset matrix layers. In this manner, the thermoset matrix 12 may be customized to have increasing or decreasing support and/or cushioning depending on user needs.

In the embodiment of the mattress assembly 10'(2) shown in FIG. 5K, a first quantity of the thermoplastic profiles 16(1)-16(N) may be encapsulated within the first thermoset matrix layer 12A and a second quantity of the thermoplastic profiles 16(1)-16(N) may be encapsulated within the second thermoset matrix layer 12B. It is noted that thermoset matrix layers may be formed with or without quantities of the thermoplastic profiles 16(1)-16(N) encapsulated therein. Also, some thermoset matrix layers may have quantities of the thermoplastic profiles 16(1)-16(N) encapsulated therein and other thermoset matrix layers may be free of the thermoplastic profiles 16(1)-16(N). In this manner, the thermoset matrix 12 may provide the support and cushioning characteristics needed by users.

Figure 6:
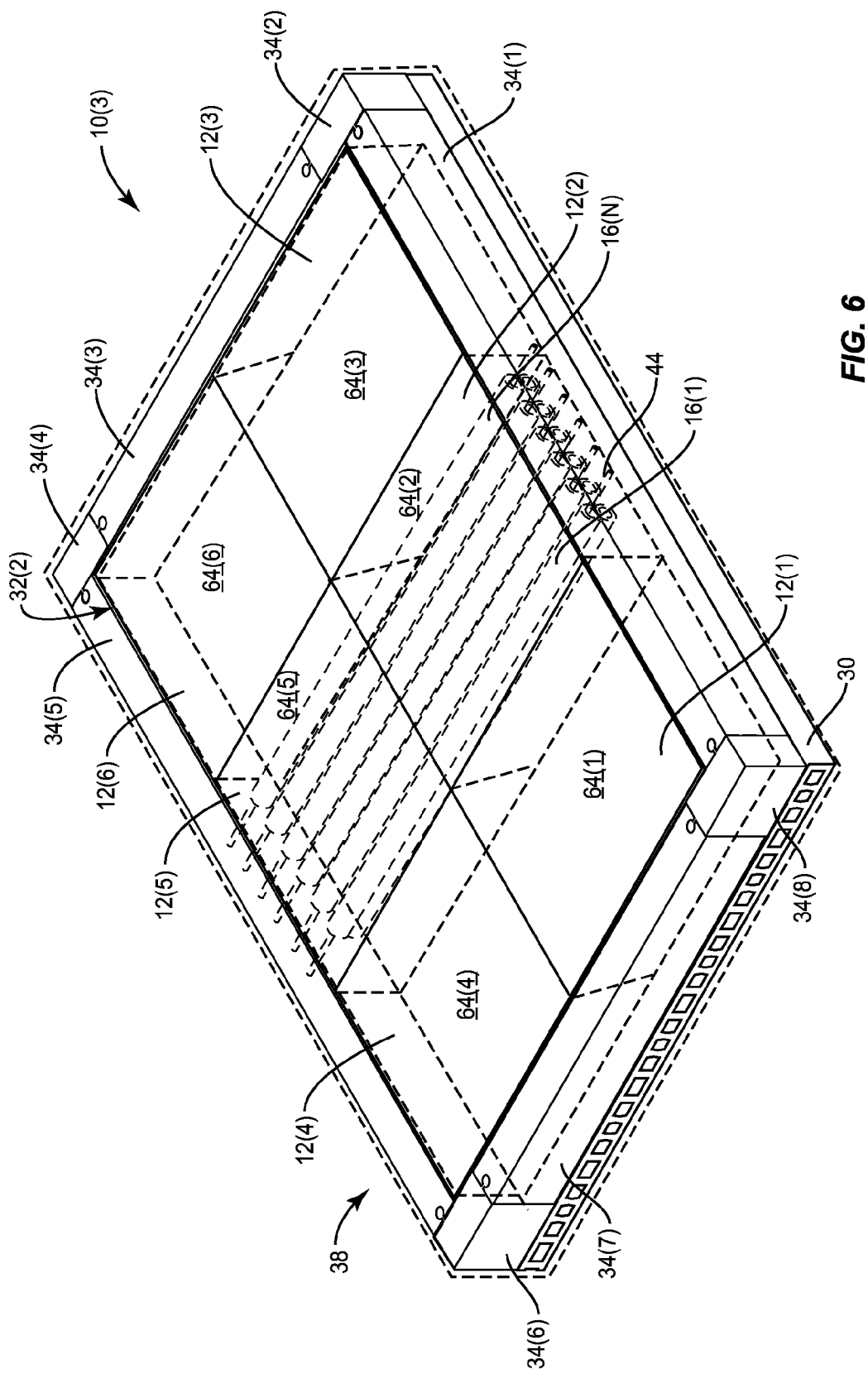
FIG. 6 is top perspective view of another embodiment of a cushioning assembly provided in the form of a mattress assembly comprising a cushioning core in the form of a mattress core, wherein the mattress core comprised of at least one core segment is disposed within the enclosure formed by the foam base and the at least one foam side support member.

Now that the process 50 for creating the mattress assembly 10(2) has been discussed, other embodiments of the mattress assembly 10(2) will be discussed. FIG. 6 is top perspective view of a cushioning assembly in the form of a mattress assembly 10(3) that is another embodiment of the mattress assembly 10(2), and so only differences will be discussed for clarity and conciseness. Instead of the mattress core 32, comprising the thermoset matrix 12 and at least one thermoplastic profile 16(1)-16(N) in a contiguous single form, a cushioning core in the form of a mattress core 32(2) is provided that comprises at least one core segment 64(1)-64(6). The core segments 64(1)-64(6) collectively fill the enclosure 38 and comprise thermoset matrixes 12(1)-12(6), respectively. However, only the core segments 64(2) and 64(5) comprise the thermoplastic profiles 16(1)-16(N) that are encapsulated. In this manner, the user may be supported by the mattress assembly 10(3), which may be customizable to locate the core segments 64(2), 64(5) containing the thermoplastic profiles 16(1)-16(N) where support is needed.

Figure 7A:
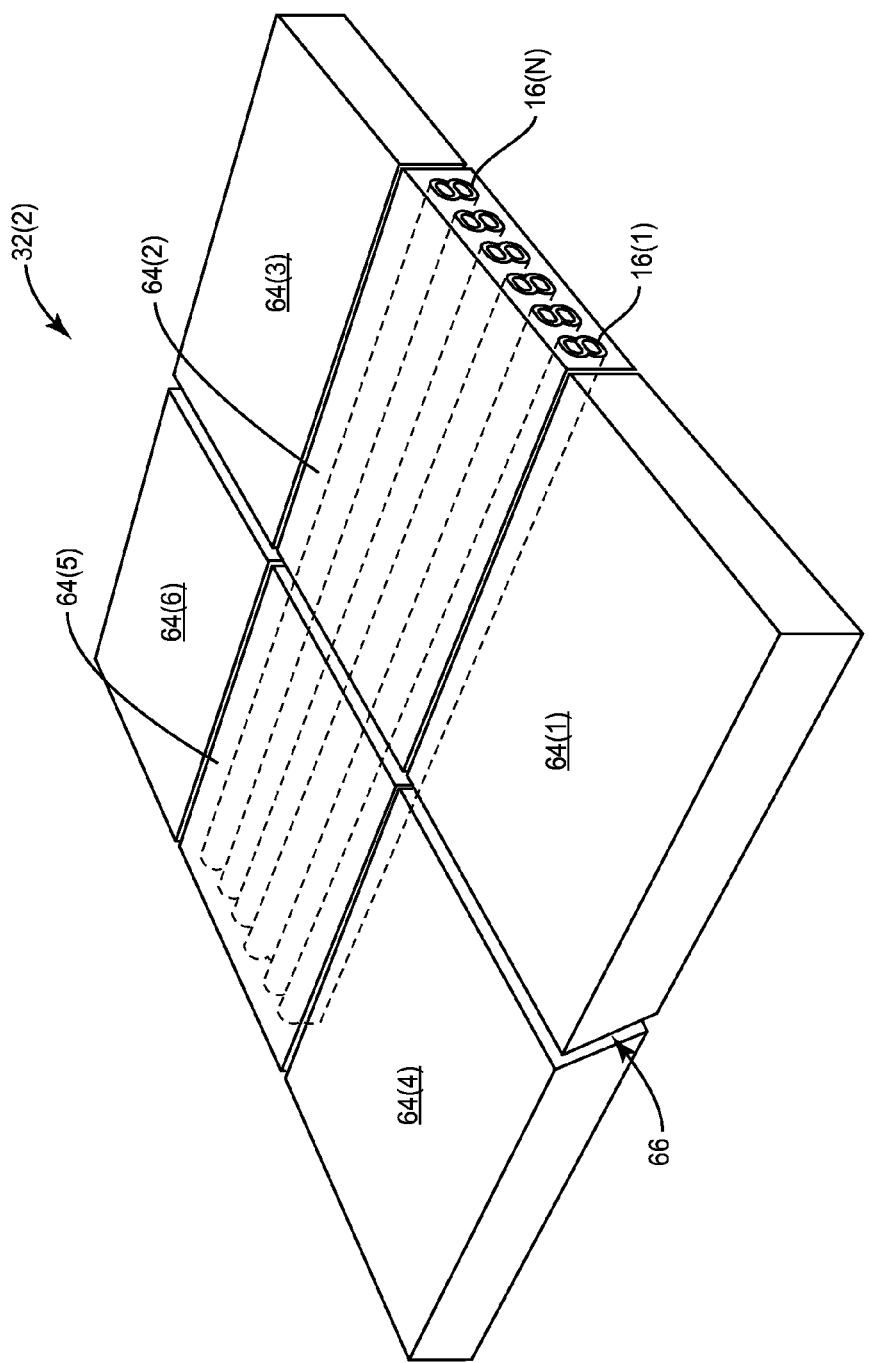
FIG. 7A is a top perspective view of the mattress core comprising the at least one core segment of FIG. 6 with the at least one foam side support member and the foam base removed.

FIG. 7A is a top perspective view of the mattress core 32(2) comprising the at least one core segment 64(1)-64(6) of FIG. 6 with the foam side support members 34(1)-34(8) and the foam base 30 removed. As shown in FIG. 7, the core segments 64(1)-64(6) of the mattress assembly 10(3) may include an angled interface 66, or shiplap joint, between adjacent ones of the core segments 64(1)-64(6). In this manner, the user will be less likely to perceive spaces between the core segments 64(1)-64(6).

Figure 7B:
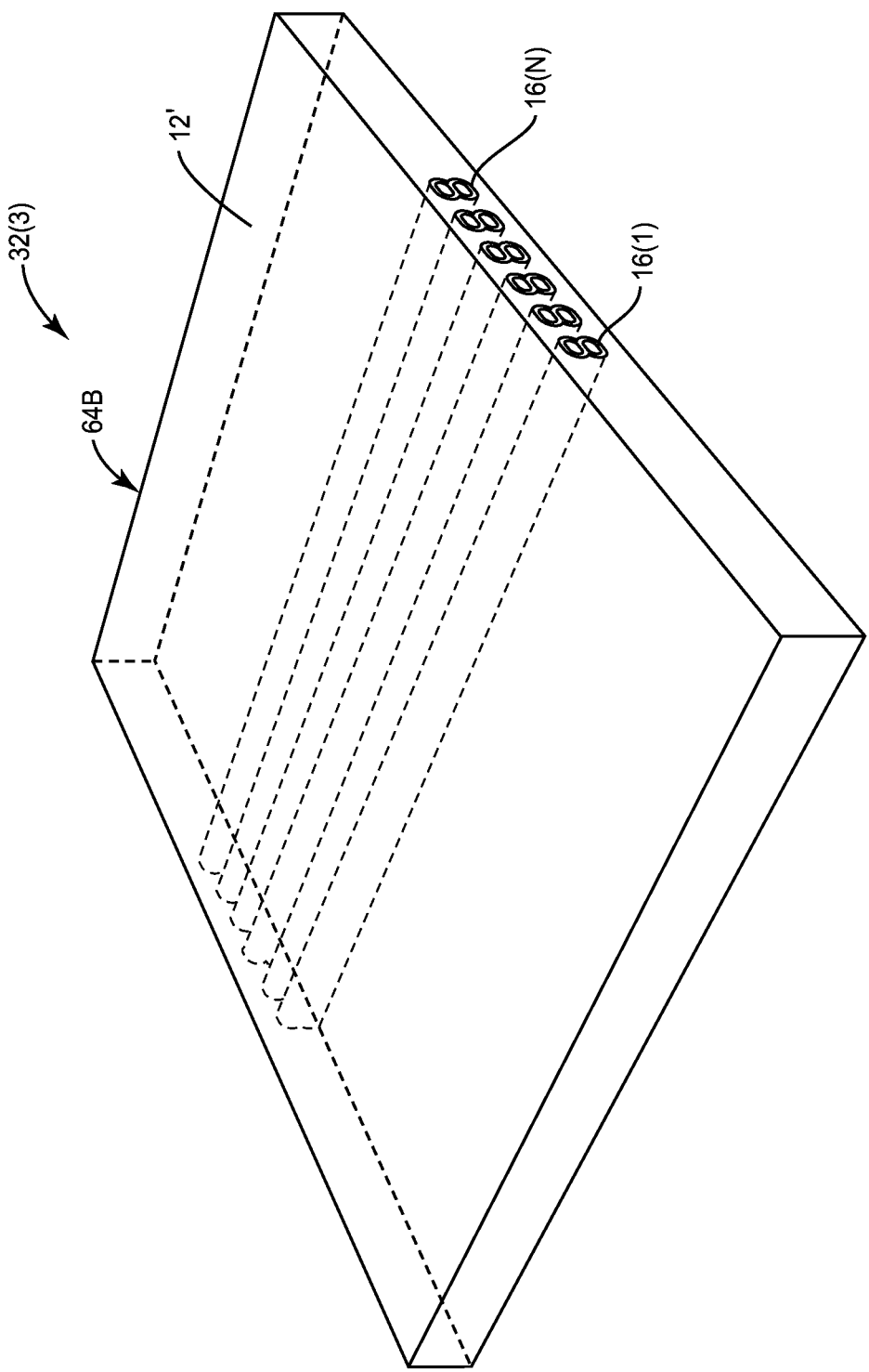
FIG. 7B is a top perspective view of another embodiment of the mattress core comprising a single core segment compatible with the mattress assembly of FIG. 6.

FIG. 7B is a top perspective view of another embodiment of a cushioning core in the form of a mattress core 32(3) comprising a single core segment 64B comprising a single thermoset matrix 12' encapsulating the thermoplastic profiles 16(1)-16(N). The mattress core 32(3) is compatible with the mattress assembly of FIG. 6. The single core segment 64B may fully replace the collective group of the core segments 64(1)-64(6). The single-piece embodiment of the mattress core 32(3) could be created independently, and then assembled optionally later together with the at least one foam side support members 34(1)-34(8) and the foam base 30 to create a mattress assembly 10(3). In this manner, the assembly is simplified as fewer parts are utilized to make the mattress assembly 10(3).

FIGS. 8A-8C are a top view, a front view, and a right side view, respectively, of the core segment 64(2) of FIG. 7A, illustrating the thermoplastic profiles 16(1)-16(N) encapsulated by the thermoset matrix 12. In this manner, the thermoplastic profiles 16(1)-16(N) may provide additional support to the user at the core segment 64(2) to support, for example, the user's torso.

Figure 9A:
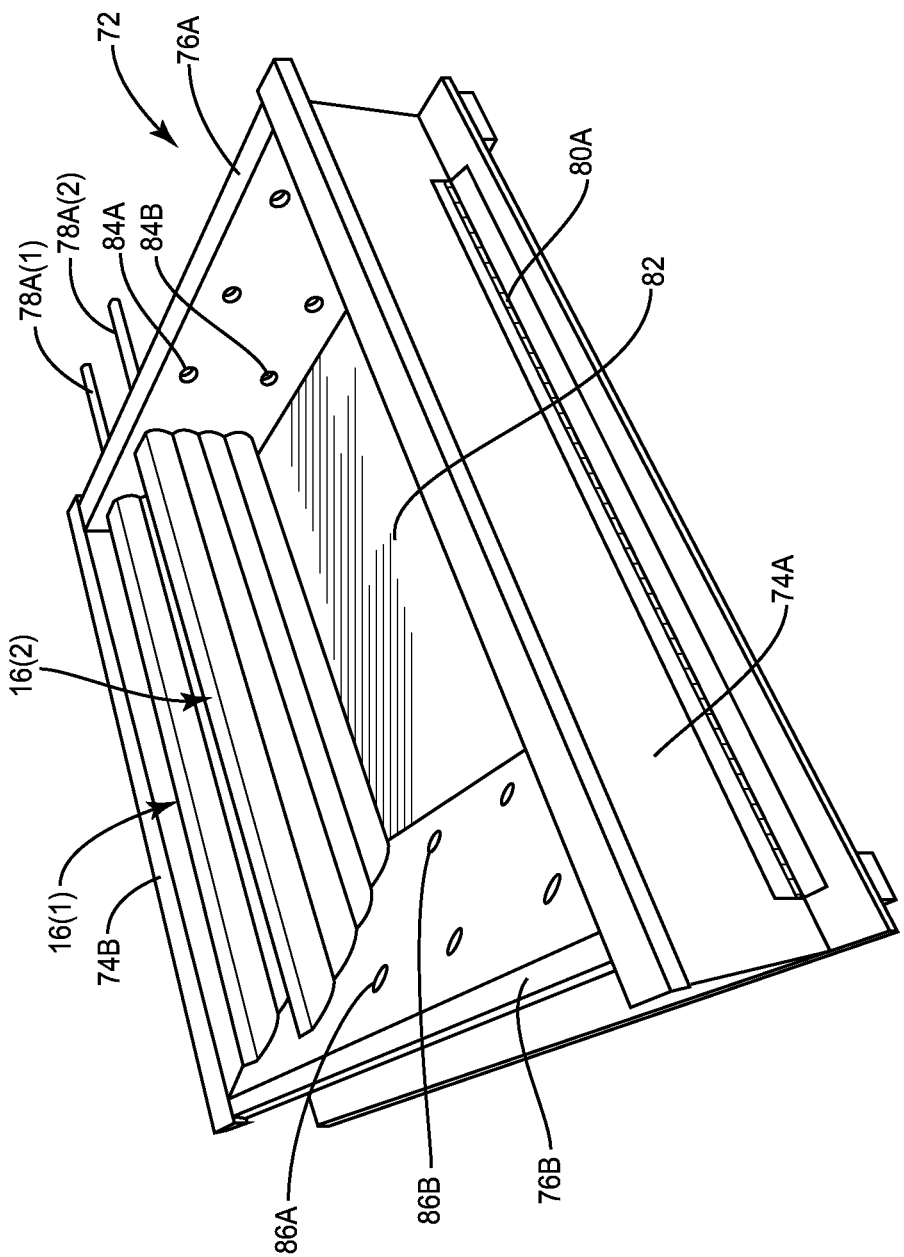
FIGS. 9A-9C are a front-top perspective view, a left-top perspective view, and a rear-top perspective view of a manufacturing mold to create the core segments of FIG. 7A.
Figure 9B:
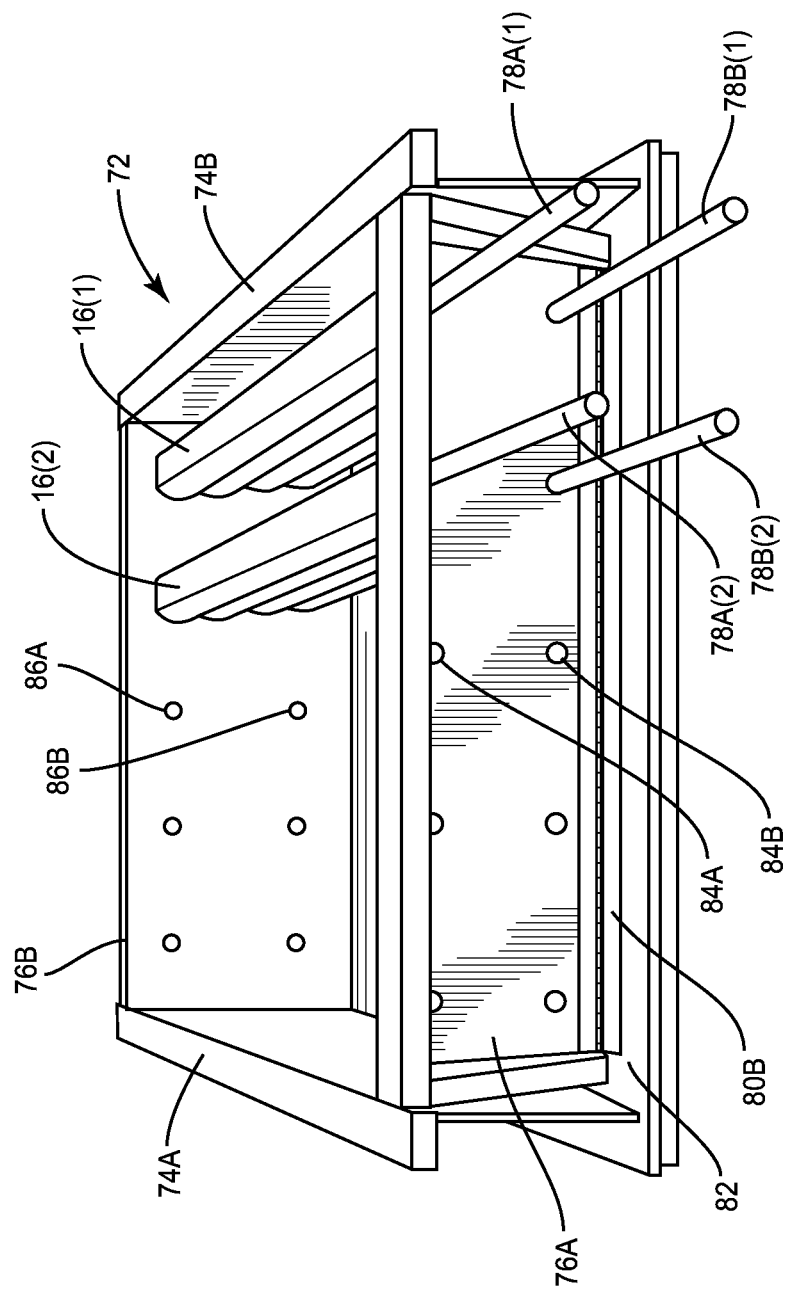
Figure 9C:
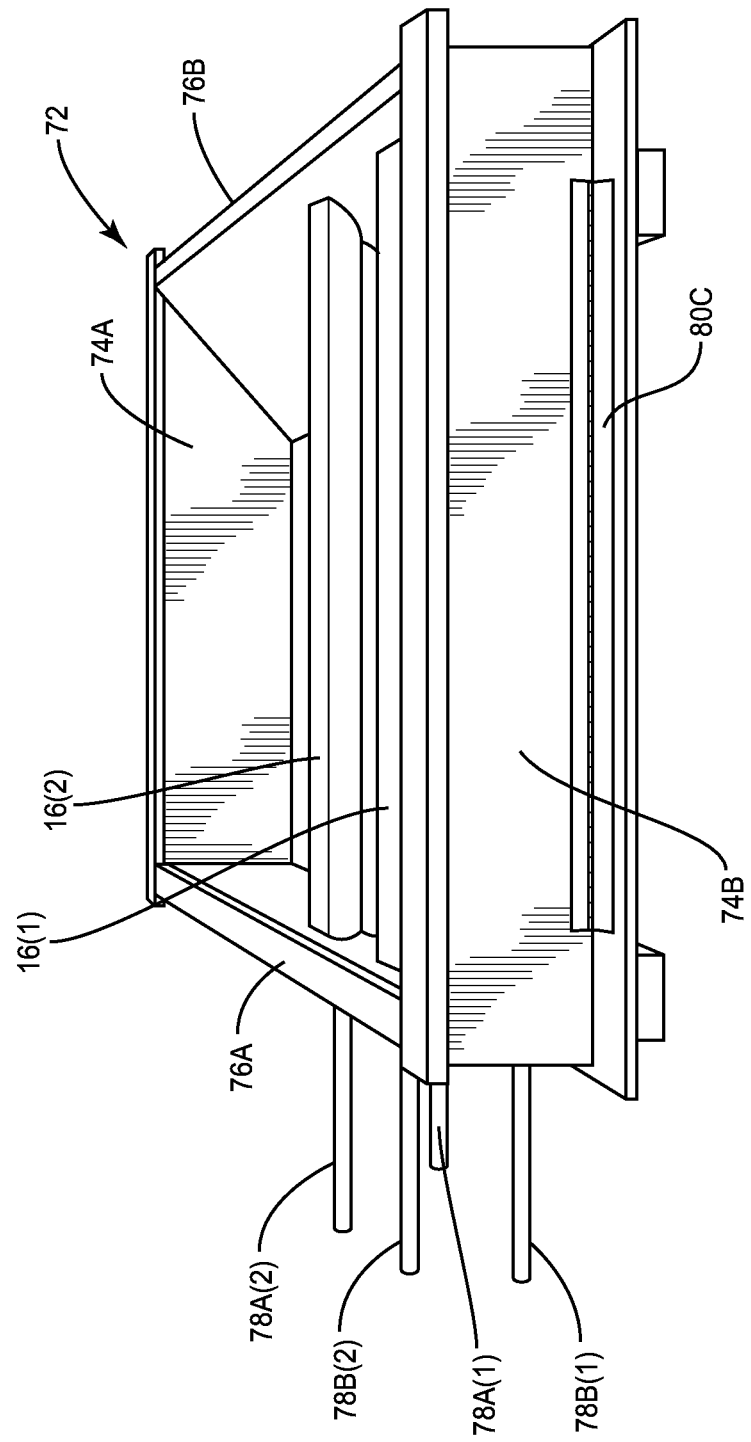
Figure 10A:
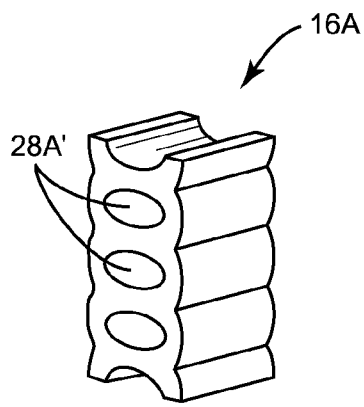
FIGS. 10A-10G are top perspective views of different embodiments of a thermoplastic profile consistent with the method of FIG. 4.
Figure 10B:
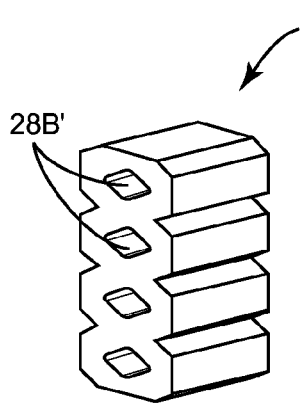
Figure 10C:
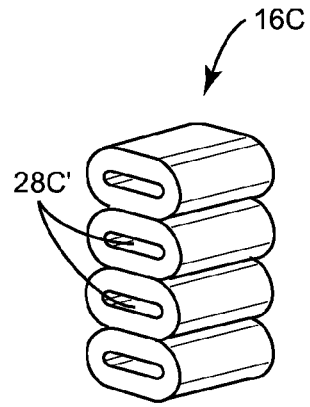
Figure 10D:
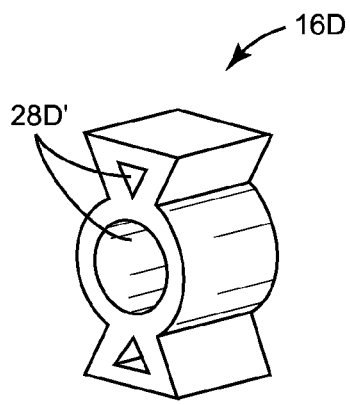
Figure 10E:
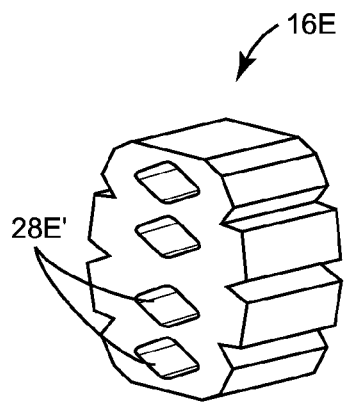
Figure 10F:
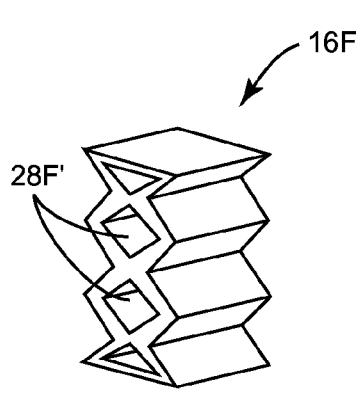
Figure 10G:
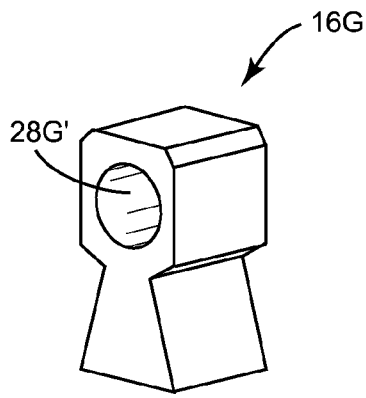
Figure 11:
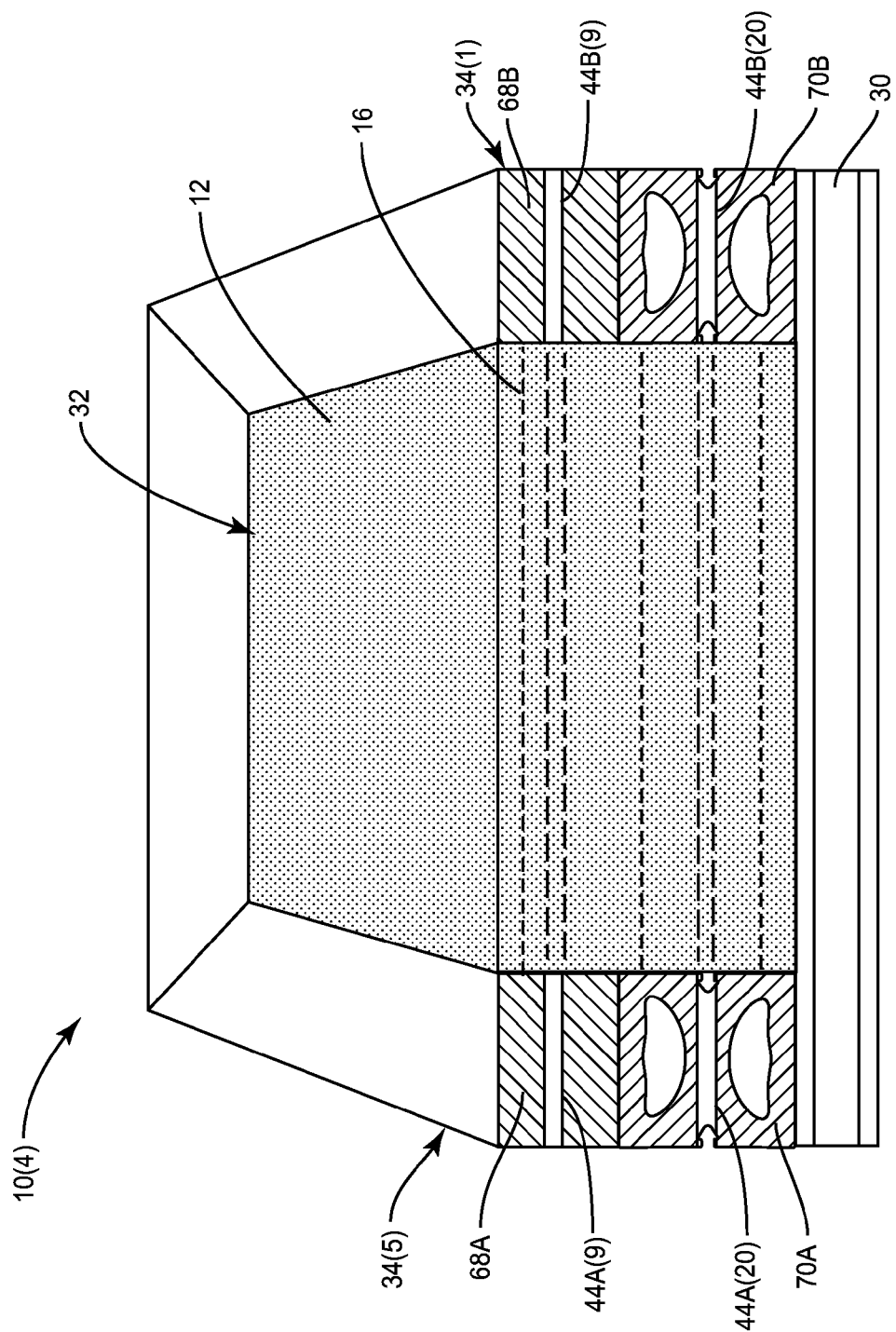
FIG. 11 is a cutaway view of another embodiment of a cushioning assembly provided in the form of a mattress assembly including the cushioning core of FIG. 2 surrounded by the at least one side support, wherein the at least one side support comprises a first side support member atop a second side support member.

FIGS. 9A-9C are a front-top perspective view, a left-top perspective view, and a rear-top perspective view of an exemplary manufacturing mold 72 to create the core segments of FIG. 7A. The manufacturing mold 72 comprises first opposing sides 74A, 74B; second opposing sides 76A, 76B; and a mold bottom member 82. The first opposing side 74A comprises through holes 84A, 84B. The first opposing side 74B comprises through holes 86A, 86B. The through holes 84A, 84B and the through holes 86A, 86B may be plugged using conventional plugs (not shown), for example, rubber plugs before being filled with thermoset material 62 to form the core segments 64(1), 64(3), 64(4), 64(6) depicted in FIG. 7A. In this manner, the conventional plugs would prevent the thermoset material 62 from leaking from the manufacturing mold 72 when the thermoset material 62 is dispensed within the manufacturing mold 72.

With continued reference to FIGS. 9A-9C, when making the core segments 64(2), 64(5), locations of the through holes 84A, 86A may be configured to allow an elongated member 78A(1) to be inserted therethrough and through the longitudinal passageway 28A of one of the at least one thermoplastic profile 16(1)-16(N). Likewise, locations of the through holes 84B, 86B may be configured to allow an elongated member 78B(1) to be inserted therethrough and through the longitudinal passageway 28B of one of the at least one thermoplastic profile 16(1)-16(N). In this manner, the thermoplastic profiles 16(1)-16(N) may be positioned within the manufacturing mold 72 and to be ready to be encapsulated within a thermoset matrix 12 to be later dispensed into the manufacturing mold 72.

It is noted that in the embodiment of the manufacturing mold 72 depicted in FIGS. 9A-9C that the opposing sides 74A, 74B, 76A may be respectively attached to the mold bottom member 82 with hinges 80A, 80C, 80B. After thermoset material 62 is dispensed and hardened in the manufacturing mold 72 then the hinges 80A, 80C, 80B may rotate to allow any one of the thermoset matrixes 12(1)-12(6) to be more easily removed.

Now that the manufacturing mold 72 has been described and various embodiments of the mattress assembly 10, other embodiments of the thermoplastic profile 16 are possible. FIGS. 10A-10G are top perspective views of thermoplastic profiles 16A-16G that are different embodiments of the thermoplastic profile 16. The thermoplastic profiles 16A-16G comprise at least longitudinal passageways 28A'-28G'. In this manner, the thermoplastic profiles 16A-16G may be positioned within the enclosure 38 by at least one removable elongated member 60.

Other embodiments of the mattress assembly 10(2) are possible. FIG. F is another embodiment of a mattress assembly 10(4). The mattress assembly 10(4) is similar to the mattress assembly 10(2), and so only the differences will be discussed for clarity and conciseness. The mattress assembly 10(4) comprises the mattress core 32 of FIG. 2 surrounded by the at least one foam side support members 34(1), 34(5). The foam side support members 34(1), 34(5) comprise first side support members 68A, 68B atop second side support members 70A, 70B, respectively. The first side support members 68A, 68B and/or the second side support members 70A, 70B may be made of thermoset and/or thermoplastic.

Note that any of the assemblies disclosed herein can be provided in any cushioning assembly desired, including but not limited to seating and bedding. Non-limiting examples of the thermoplastic material that can be used to form the thermoplastic profile 16 include: polypropylene, polypropylene copolymers, polystyrene, polyethylenes, ethylene vinyl acetates (EVAs), polyolefins, including metallocene catalyzed low density polyethylene, thermoplastic olefins (TPOs), thermoplastic polyester, thermoplastic vulcanizates (TPVs), polyvinyl chlorides (PVCs), chlorinated polyethylene, styrene block copolymers, ethylene methyl acrylates (EMAs), ethylene butyl acrylates (EBAs), and the like, and derivatives thereof. The density of the thermoplastic material may be provided to any density desired to provide the desired weight and support characteristics for the unitary composite cushioning structure. Further, a thermoplastic material can be selected that is inherently resistant to microbes and bacteria, making such desirable for use in the application of cushioning structures. These thermoplastic materials can also be made biodegradable and fire retardant through the use of additive master batches.

Non-limiting examples of the thermoset material 62 and the additional thermoset material 62' that may be used to form the thermoset matrix 12 include: polyurethanes, natural and synthetic rubbers, such as latex, silicones, EPDM, isoprene, chloroprene, neoprene, melamine-formaldehyde, and polyester, and derivatives thereof. The density of the thermoset material may be provided to any density desired to provide the desired resiliency and cushioning characteristics to the unitary composite cushioning structure. The thermoset material and can be soft or firm depending on formulations and density selections. Further, if the thermoset material selected is a natural material, such as latex for example, it may be considered biodegradable. Further, bacteria, mildew, and mold cannot live in certain thermoset foams.

Further, the foam base 30 and the foam side support members 34(1)-34(8) may be made of any polymeric foam material, for example, an extruded or molded closed-cell polyethylene foam. The enclosure 38 comprises the foam base 30 and the foam side support members 34(1)-34(8). The enclosure 38 may be formed from one or more materials selected from the group consisting of a polystyrene, a polyolefin, a polyethylene, a polybutane, a polybutylene, a polyurethane, a polyester, an ethylene acrylic copolymer, an ethylene-vinyl-acetate copolymer, an ethylene-methyl acrylate copolymer, an ethylene-butyl-acrylate copolymer, an ionomer, a polypropylene, a copolymer of polypropylene, latex rubber, a thermoset material, and the like, as non-limiting examples. Further, the enclosure 38 may be formed from a combination of thermoset and thermoplastic material (s), either foamed or not, to provide composite cushioning characteristics. Further, the enclosure 38 may be formed from filler materials. Filler material examples include, but are not limited to, a ground foam reclaim material, a nano clay, a carbon nano tube, calcium carbonate, fly ash, and corc dust, as examples. Further, the enclosure 38 may exhibit any degree of firmness desired.

Many modifications of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A method of creating a mattress or seat assembly, comprising:
   extruding at least one thermoplastic profile;
   disposing the at least one thermoplastic profile within an enclosure by suspending the at least one thermoplastic profile with at least one removable elongated member, wherein the suspending the at least one thermoplastic profile with at least one removable elongated member comprises extending the at least one removable elongated member through the at least one thermoplastic profile; and
   dispensing thermoset material within the enclosure to encapsulate the at least one thermoplastic profile to form a thermoset matrix as part of a cushioning core, wherein the cushioning core comprises the thermoset matrix encapsulating the at least one thermoplastic profile.

2. The method of claim 1, wherein the cushioning core is comprised of a mattress core.

3. The method of claim 1, wherein the extruding the at least one thermoplastic profile comprises forming a longitudinal passageway through each of the at least one thermoplastic profile.

4. The method of claim 3, wherein the dispensing the thermoset material comprises forming a top planar surface opposite a bottom planar surface, and the top planar surface and the bottom planar surface are parallel or substantially parallel.

5. The method of claim 4, wherein the dispensing the thermoset material further comprises disposing the at least one thermoplastic profile between the top planar surface and the bottom planar surface.

6. The method of claim 1, wherein the dispensing the thermoset material further comprises dispensing polyurethane or latex or other suitable multi part formulated cushioning material.

7. The method of claim 1, further comprising providing the enclosure as a mattress enclosure comprising a foam base and at least one side support that is supported by the foam base, the at least one side support and the foam base are arranged to enclose an inner volume configured to hold the cushioning core.

8. The method of claim 7, wherein the at least one side support is at least one pair of opposite side supports, the method further comprising cutting the at least one thermoplastic profile to a length to form abutments against opposite side supports of the at least one pair of opposite side supports, wherein a seal is created by the abutments.

9. The method of claim 7, wherein the at least one side support is at least one pair of opposite side supports, and
   wherein the disposing the at least one thermoplastic profile comprises making at least one opening in each opposite side support of the at least one pair of opposite side supports and supporting the at least one removable elongated member with the at least one opening in the opposite side supports.

10. The method of claim 9, wherein the at least one removable elongated member is a rigid support configured to interface with an internal surface of the at least one thermoplastic profile.

11. The method of claim 7, wherein the at least one side support comprises thermoplastic.

12. The method of claim 7, wherein the foam base comprises thermoplastic.

13. The method of claim 1, wherein the suspending the at least one thermoplastic profile with at least one removable elongated member comprises disposing the at least one removable elongated member horizontally within the enclosure to suspend the at least one thermoplastic profile horizontally within the enclosure.

14. The method of claim 9, wherein each of the at least one removable elongated member has a first end and a second end opposite the first end, and
   wherein the supporting the at least one removable elongated member with the at least one opening in the opposite side supports comprises supporting the first end of each of the at least one removable elongated member in one of the opposite side supports of a respective pair of opposite side supports, and supporting the second end of each of the at least one removable elongated member in the other of the opposite side supports of the respective pair of opposite side supports.

* * * * *